US009550683B2

(12) United States Patent
Higuchi

(10) Patent No.: US 9,550,683 B2
(45) Date of Patent: Jan. 24, 2017

(54) COLLOIDAL SILICA, AND METHOD FOR PRODUCTION THEREOF

(75) Inventor: Kazuaki Higuchi, Fukuchiyama (JP)

(73) Assignee: Fuso Chemical Co., Ltd., Osaka-shi (JP)

( * ) Notice: Subject to any disclaimer, the term of this patent is extended or adjusted under 35 U.S.C. 154(b) by 0 days.

(21) Appl. No.: 12/450,331

(22) PCT Filed: Mar. 27, 2008

(86) PCT No.: PCT/JP2008/055943
§ 371 (c)(1),
(2), (4) Date: Sep. 22, 2009

(87) PCT Pub. No.: WO2008/123373
PCT Pub. Date: Oct. 16, 2008

(65) Prior Publication Data
US 2010/0071272 A1    Mar. 25, 2010

(30) Foreign Application Priority Data

Mar. 27, 2007  (JP) .................................. 2007-082159

(51) Int. Cl.
*B24D 3/02*    (2006.01)
*C09C 1/68*    (2006.01)
(Continued)

(52) U.S. Cl.
CPC ........... *C01B 33/141* (2013.01); *C09K 3/1409* (2013.01); *C09K 3/1463* (2013.01)

(58) Field of Classification Search
None
See application file for complete search history.

(56) References Cited

U.S. PATENT DOCUMENTS 3,440,174 A * 4/1969 Albrecht ............... C01B 33/151
106/36
3,789,009 A * 1/1974 Irani ................... C01B 33/1435
516/83
(Continued)

FOREIGN PATENT DOCUMENTS

JP    61-136909 A    6/1986
JP    61-158810 A    7/1986
(Continued)

OTHER PUBLICATIONS

Stober, W. et al., "Controlled Growth of Monodisperse Silica Spheres in the Micron Size Range", J. Colloid Interface Sci. 26, 62 (1968).*
(Continued)

*Primary Examiner* — Kaj K Olsen
*Assistant Examiner* — Ross J Christie
(74) *Attorney, Agent, or Firm* — Locke Lord LLP; James E. Armstrong, IV; Nicholas J. DiCeglie, Jr.

(57) ABSTRACT

The present invention provides dense silica particles with reduced metal impurities. Specifically, the present invention provides a colloidal silica produced by using an alkyl silicate as a starting material, wherein, with respect to a sample prepared by adding, as an internal standard, 1 wt. % of polydimethylsilane to a dried product of the colloidal silica, a peak area value calculated using a formula of a colloidal silica peak area/a polydimethylsilane peak area is 15 or less, the peak areas being determined by an obtained solid-state $^{29}$Si-CP/MAS-NMR spectrum. The present invention further provides a method for producing the colloidal silica.

5 Claims, 9 Drawing Sheets

(51) Int. Cl.
  *C09K 3/14* (2006.01)
  *C01B 33/141* (2006.01)

(56) References Cited

U.S. PATENT DOCUMENTS

| | | | |
|---|---|---|---|
| 4,664,679 A | 5/1987 | Kohyama et al. | |
| 4,970,133 A * | 11/1990 | Vermeersch et al. | 430/175 |
| 5,013,585 A | 5/1991 | Shimizu et al. | |
| 5,746,992 A * | 5/1998 | Yoldas et al. | 423/338 |
| 6,025,455 A * | 2/2000 | Yoshitake et al. | 528/10 |
| 6,160,067 A * | 12/2000 | Eriyama et al. | 526/279 |
| 6,334,880 B1 * | 1/2002 | Negrych et al. | 51/308 |
| 6,515,190 B1 * | 2/2003 | Harmer et al. | 568/939 |
| 6,750,257 B2 | 6/2004 | Matsumura et al. | |
| 7,186,440 B2 * | 3/2007 | Yoshitake et al. | 427/220 |
| 2001/0011105 A1 * | 8/2001 | Noguchi et al. | 516/81 |
| 2003/0176729 A1 * | 9/2003 | Harmer et al. | 560/241 |
| 2006/0112860 A1 * | 6/2006 | Yoshitake et al. | 106/490 |
| 2006/0150860 A1 | 7/2006 | Nozaki | |
| 2006/0283095 A1 * | 12/2006 | Mahulikar et al. | 51/308 |
| 2007/0003701 A1 * | 1/2007 | Yoshitake et al. | 427/387 |
| 2007/0075292 A1 * | 4/2007 | Mahulikar et al. | 51/308 |
| 2007/0237701 A1 | 10/2007 | Yamakawa et al. | |
| 2007/0254964 A1 * | 11/2007 | Mahulikar et al. | 51/308 |
| 2009/0143490 A1 * | 6/2009 | Masuda et al. | 516/34 |

FOREIGN PATENT DOCUMENTS

| | | | |
|---|---|---|---|
| JP | 02-160613 A | | 6/1990 |
| JP | H06316407 A | | 11/1994 |
| JP | 10-203820 A | | 8/1998 |
| JP | 11-060232 A | | 3/1999 |
| JP | 11349336 A | * | 12/1999 |
| JP | 11349337 A | * | 12/1999 |
| JP | 2000-281330 A | | 10/2000 |
| JP | 2001-002411 A | | 1/2001 |
| JP | 2001002411 A | * | 1/2001 |
| JP | 2001-048520 A | | 2/2001 |
| JP | 2001354408 A | | 12/2001 |
| JP | 2002-045681 A | | 2/2002 |
| JP | 2002-050594 A | | 2/2002 |
| JP | 2004-091220 A | | 3/2004 |
| JP | 2005-060217 A | | 3/2005 |
| JP | 2005-060219 A | | 3/2005 |
| JP | 2005-162533 A | | 6/2005 |
| JP | 2005-314197 A | | 11/2005 |
| JP | 2006052352 A | * | 2/2006 |
| JP | 2007070163 A | | 3/2007 |
| JP | 2007137972 A | | 6/2007 |
| WO | WO-2004/074180 A1 | | 9/2004 |
| WO | WO 2005009604 A1 | * | 2/2005 |

OTHER PUBLICATIONS

International Search Report mailed Jun. 17, 2008, issued on PCT/JP2008/055943.

* cited by examiner

COLLOIDAL SILICA, AND METHOD FOR PRODUCTION THEREOF

TECHNICAL FIELD

The present invention relates to a colloidal silica and a method for producing the same. Specifically, the present invention relates to a colloidal silica suitable as a polishing material, and to a method for producing the same.

BACKGROUND ART

A colloidal silica is a dispersion of silica fine particles in media such as water etc., and are used not only as a property-improving agent in the fields of papers, fibers, steel, and the like, but also as a polishing material for electronic materials, such as semiconductor wafers, etc.

Mainly, two methods, i.e., a water glass method and an alkoxide method, have been known as production methods of a colloidal silica.

The water glass method is a method for growing particles by subjecting a sodium silicate to an ion exchange so as to prepare active silicic acid, and adding, with heating, the obtained active silicic acid to a seed particle-containing aqueous solution, in which the pH was adjusted with NaOH (Patent Document 1). According to this method, particles with a relatively dense structure can be obtained.

The alkoxide method, otherwise known as the Stöber method, comprises subjecting an alkyl silicate (tetraalkoxysilane) to hydrolyzation and condensation in the presence of a basic catalyst to grow particles, thereby producing silica particles. This method enables the preparation of colloidal particles having particle sizes ranging from nano- to microscale. For example, Patent Document 2 suggests a method for producing a cocoon-shaped colloidal silica, comprising adding methyl silicate (tetramethoxysilane) or a mixture of methyl silicate and methanol dropwise to a mixed solvent comprising water, methanol and ammonia, or to a mixed solvent comprising ammonia and ammonium salt under stirring for 10 to 40 minutes so as to allow the methyl silicate to react with water; and thereby producing a colloidal silica having a minor axis diameter of 10 to 200 nm and a major-axis/minor-axis ratio of 1.4 to 2.2. Further, Patent Document 3 discloses a method for producing a cocoon-shaped colloidal silica, comprising hydrolyzing a tetramethoxysilane tetramer while adding the tetramethoxysilane tetramer dropwise to a mixed liquid comprising methanol, water and ammonia.

In addition to the above, many methods, such as a production method of silica particles utilizing the alkoxide method, etc. have been proposed (for example, Patent Documents 4 to 10).

Further, Patent Document 11 discloses a production method of a silica sol in which elongate-shaped amorphous silica particles are dispersed in a liquid dispersion. This method comprises hydrolyzing tetraethyl silicate and an ethyl silicate oligomer with an acid catalyst; adding an alkali catalyst thereto to adjust the pH to 7 or more; and heating the resulting product to allow it to polymerize.

Patent Document 1: Japanese Unexamined Patent Publication No. 61-158810
Patent Document 2: Japanese Unexamined Patent Publication No. 11-60232
Patent Document 3: WO2004/074180
Patent Document 4: Japanese Unexamined Patent Application Publication No. 2004-91220
Patent Document 5: Japanese Unexamined Patent Application Publication No. 2002-50594
Patent Document 6: Japanese Unexamined Patent Application Publication No. 2005-162533
Patent Document 7: Japanese Unexamined Patent Application Publication No. 2005-60219
Patent Document 8: Japanese Unexamined Patent Application Publication No. 2002-45681
Patent Document 9: Japanese Unexamined Patent Application Publication No. 2005-312197
Patent Document 10: Japanese Unexamined Patent Application Publication No. 2005-60217
Patent Document 11: Japanese Unexamined Patent Application Publication No. 2001-48520

DISCLOSURE OF THE INVENTION

Problems to be Solved by the Invention

Particularly when a colloidal silica is used as a polishing material, silica particles with a dense structure must be prepared. More specifically, the preparation of particles in which siloxane bonds are fully formed is required. In other words, it is preferable to prepare particles having a reduced amount of residual silanol groups.

However, the use of a known method to produce a colloidal silica, which is usable particularly as a polishing material, causes the following problems.

According to the foregoing water glass method, a colloidal silica with a dense structure can be obtained, achieving excellent properties as a polishing material; however, the sodium content cannot be completely removed therefrom. Due to the presence of metal impurities such as sodium etc., the application thereof to semiconductor processes would be restricted.

In contrast, according to the foregoing alkoxide method, although the obtained product can be kept free of sodium etc., if a particle diameter, particle form and the like are to be controlled, a particle growth rate would be significantly increased. This would lead particles to grow before a silica forms a stable structure, and therefore, particles with a dense structure cannot be obtained. In the alkoxide method, the particle growth rate can be controlled by greatly decreasing the addition rate; however, the OH amount cannot be sufficiently reduced due to the low reaction temperature. Further, if the growth rate is changed, other factors such as the particle diameter, particle form and the like would also be changed.

In view of the above, the main object of the present invention is to provide dense silica particles with reduced metal impurities.

Means for Solving the Problems

The present inventor found that the solid-state $^{29}$Si-CP/MAS-NMR spectrum is usable as an index for evaluating density of a silica particle. The present inventor further found, as revealed in Table 1, that the comparison of spectrums between a colloidal silica obtained using a known water glass method and that obtained using a known Stöber method shows a remarkable difference in peak area values therebetween.

TABLE 1

| Category | Sample | Specific Surface Area (m²/g) | Si(OH)$_2$ | Si(OH)$_1$ | Si(OH)$_0$ | Peak Area Value |
|---|---|---|---|---|---|---|
| Water Glass Method | "Snowtex-20" produced by Nissan Chemical Industries, Ltd. | 195 | 2 | 50 | 48 | 4.0 |
| Stober method | "PL-2L" Produced by Fuso Chemical Co., Ltd. | 136 | 5 | 49 | 46 | 47.8 |

*Si(OH)$_2$: Si(OH)$_2$(OSi)$_2$; Si(OH)$_1$: Si(OH)(OSi)$_3$; Si(OH)$_0$: Si(OSi)$_4$; Peak Area Value: Total area of three peaks standardized with an internal standard peak area Based on such findings, the present inventor conducted extensive research in view of the problems of known techniques, and found that the use of a production method comprising a specific step enables the production of silica particles having distinctive properties that offer the advantages of both silica particles prepared in the water glass method, and those prepared in the Stöber method; thereby, the above object can be achieved. Accordingly, the present invention has been accomplished.

Specifically, the present invention relates to the following colloidal silica and method for producing the same.

In one aspect, the invention provides colloidal silica produced by using an alkyl 20 silicate as a starting material, wherein, with respect to a sample prepared by adding, as an internal standard, 1 wt. % of polydimethylsilane to a dried product of the colloidal silica, a peak area value calculated using a formula of a colloidal silica peak area/a polydimethylsilane peak area is 15 or less, the peak areas being determined by measuring a solid-state $^{29}$Si-CP/MAS-NMR spectrum of the dried product.

In certain embodiments, the alkyl silicate is tetramethyl orthosilicate.

In other embodiments, the peak strength ratio of Si(OH)$_0$ obtained by measuring the solid-state $^{29}$Si-CP/MAS-NMR spectrum is 40 or more, relative to the total strength (area value) of colloidal silica-originating peaks, considered as 100.

In still other embodiments, each amount of
1) sodium,
2) an alkaline earth metal selected from calcium and magnesium; and
3) a heavy metal selected from iron, titanium, nickel, chromium, copper, zinc, lead, silver, manganese, and cobalt, contained in the colloidal silica is 1 wt. ppm or less.

In another aspect, the invention provides a polishing material comprising the colloidal silica of the invention.

In still another aspect, the invention provides a method for producing a colloidal silica, comprising the steps of:
1) preparing a mother liquid comprising an alkali catalyst and water; and
2) adding, to the mother liquid, a hydrolyzed liquid obtained by hydrolyzing an alkyl silicate,
wherein the hydrolyzed liquid is added to the mother liquid at a rate of not greater than 41 g of silica/hour/kg of mother liquid.

In yet another aspect, the invention provides a method for producing a colloidal silica, comprising the steps of:
1) preparing a mother liquid comprising an alkali catalyst, water and seed particles; and
2) adding, to the mother liquid, a hydrolyzed liquid obtained by hydrolyzing an alkyl silicate,
wherein the hydrolyzed liquid is added to the mother liquid at a rate of not greater than 4.2×10$^{-3}$ g of silica/hour/m² of seed particle surface area.

In some embodiments, the methods of the invention further comprise a step of preparing the hydrolyzed liquid by hydrolyzing an alkyl silicate in the absence of a catalyst.

In still other embodiments, the alkyl silicate is tetramethyl orthosilicate.

Effect of the Invention

Contrary to known methods for producing silica particles or colloidal silica, the production method of the present invention employs a step of adding, to a mother liquid, an alkyl silicate hydrolyzed liquid, which is separately prepared. Namely, the growth rate of silica particles can be controlled by adjusting the addition rate of the alkyl silicate hydrolyzed liquid. In particular, when particles grow relatively slowly, silica particles with reduced residual silanol groups can be obtained.

According to the production method of the present invention, the addition rate adjustment etc. can also improve the monodispersity of the obtained colloidal silica. In particular, the production method of the present invention can also provide a colloidal silica having properties in which a CV value calculated using the following formula (1) is 40 or less. In the following formula, SD represents a standard deviation and D represents an average particle diameter (a secondary particle diameter), which are measured using particle size analysis equipment utilizing a dynamic light-scattering method.

$$CV=(SD/D)\times 100 \tag{1}$$

As for the particle size analysis equipment utilizing a dynamic light-scattering method, the commercially available product "ELS8000" (produced by Otsuka Electronics Co., Ltd.) may be used for the measurement. As for a measurement sample, those prepared by adding 200 μL of a colloidal silica to 10 mL of 0.05 wt. % aqueous sodium decyl sulfate (SDS) solution, and homogenizing the obtained product, are utilized.

The production method of the present invention can also provide a colloidal silica with relatively high purity, because metal impurities are never contained therein.

Additionally, because the hydrolyzation is preliminarily carried out under acidic conditions, unreacted alkyl silicate, which would remain under basic conditions ("Sol-Gel ho no Gijutsu Teki Kadai to Sono Taisaku" (Technical Problems of Sol-Gel Method and Countermeasures for them), on pages 8 and 50, Industrial Publishing & Consulting, Inc., 1990), will not be present. Therefore, a step of lowering the pH to drive the reaction to completion is not required. Namely, the steps can be advantageously simplified for a product with a high pH value.

According to the colloidal silica of the present invention, the number of residual silanol groups is relatively decreased, achieving a high degree of siloxane skeleton perfection. In other words, the particles have a dense structure. For this reason, the colloidal silica of the present invention can exert high polishing performance as a polishing material, particularly when used as a polishing material for polishing electronic industry materials (in particular semiconductor wafers). The use of, as a polishing material, the colloidal silica of the present invention for such materials can improve the polishing rate (speed).

A colloidal silica having a large number of residual silanol groups or largely distorted siloxane skeletons is susceptible to alkali attack. The colloidal silica of the present invention, however, has a reduced number of residual silanol groups and stable siloxane skeletons, exhibiting high alkali resistance. If the alkali resistance is insufficient, a polishing material with a high pH value will undergo a change in quality during storage, and therefore, a constant polishing rate cannot be achieved. Such problems can be avoided by the present invention.

BEST MODE FOR CARRYING OUT THE INVENTION

1. Colloidal Silica

The colloidal silica of the present invention can be obtained by using an alkyl silicate as a starting material. Such a colloidal silica has a feature in which, with respect to a sample prepared by adding, as an internal standard, 1 wt. % of polydimethylsilane to a dried product of the colloidal silica, a peak area value calculated using a formula of a colloidal silica peak area/a polydimethylsilane peak area is 15 or less, the peak areas being determined by measuring a solid-state $^{29}$Si-CP/MAS-NMR spectrum of the dried product. As an alkyl silicate used as a starting material, tetramethyl orthosilicate (TMOS) is preferable.

With respect to the colloidal silica of the present invention, the peak area value is 15 or less, preferably 12 or less, and more preferably 10 or less. The lower limit is not critical, but is about 8.

Figure 1:
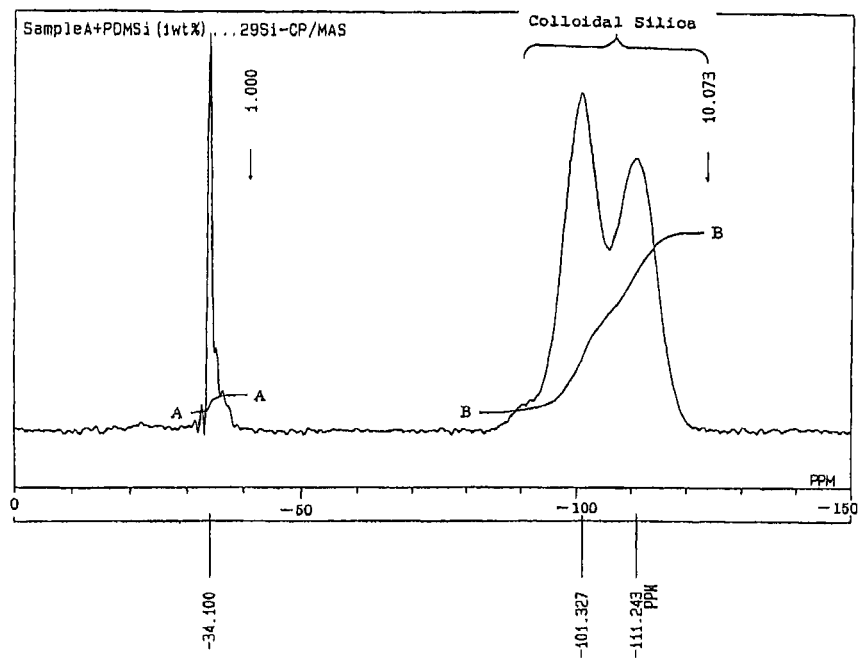
FIG. 1 is a solid-state $^{29}$Si-CP/MAS-NMR spectrum with respect to a dried product of the colloidal silica obtained in Example 1.
Figure 2:
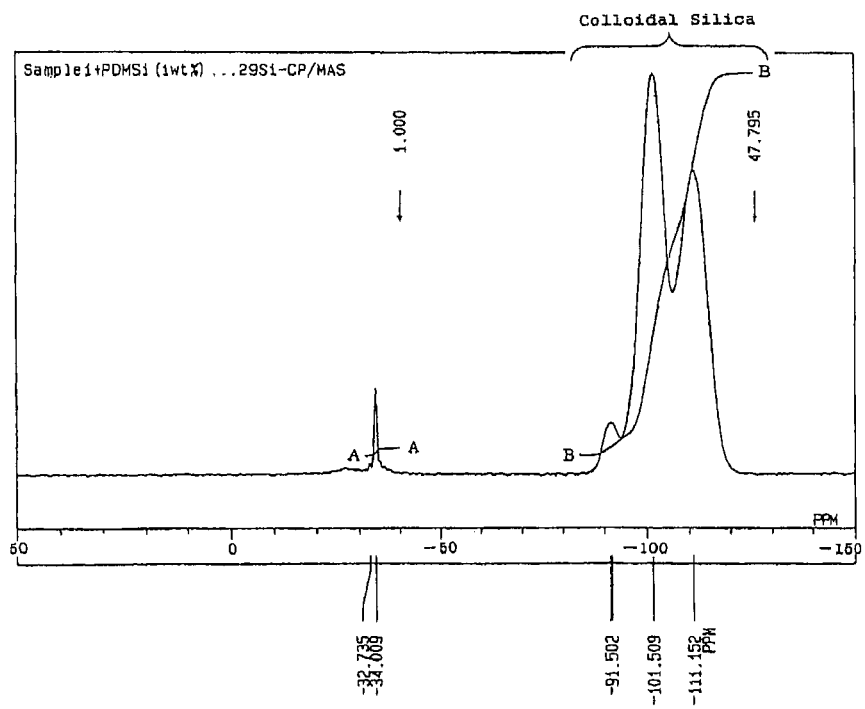
FIG. 2 is a solid-state $^{29}$Si-CP/MAS-NMR spectrum with respect to a dried product of the colloidal silica (a conventional product of Fuso Chemical Co., Ltd.; product name "PL-2L") obtained in Comparative Example 1.

The peak area value represents the number of the residual silanol groups in a colloidal silica (see, for example, "43rd Proceedings of the Thermosetting Plastics Symposium Japan", on page 45 (1993)). Specifically, with respect to $Si(OH)_2$ and $Si(OH)_1$, the number of Si atoms having OH groups, which directly bond to the Si, are counted; and with respect to $Si(OH)_0$, the number of Si atoms having no OH groups, which directly bond to the Si, but having them being in close proximity, are counted. The smaller ratio above implies a small absolute number of residual silanol groups, and is therefore preferable in terms of the colloidal silica of the present invention. FIG. 1 is a solid-state $^{29}$Si-CP/MAS-NMR spectrum with respect to a dried product of the present invention. FIG. 2 is a solid-state $^{29}$Si-CP/MAS-NMR spectrum with respect to a dried product of a conventional product. In FIGS. 1 and 2, the difference of elevation between A-A represents the polydimethylsilane peak area, and the difference of elevation between B-B represents the colloidal silica peak area. In relation to this, a standardization value determined by considering the polydimethylsilane peak area as "1" is used as a peak area value, which is shown at around the upper right of the corresponding peak on the NMR chart. Comparing the results shown in FIGS. 1 and 2, the peak area value in FIG. 1 is 9.747, whereas the peak area value in FIG. 2 is 47.795. This reveals that the colloidal silica of the present invention contains very few residual silanol groups, as an absolute number. The peak area value above can be calculated from the ratio of the integration curve heights determined by a data-processing circuit equipped with a known NMR spectrum-analyzer.

With respect to the colloidal silica of the present invention, a peak strength ratio of $Si(OH)_0$ obtained by measuring the solid-state $^{29}$Si-CP/MAS-NMR spectrum is preferably 40 or more, and more preferably 50 or more, relative to the total strength (area value) of colloidal silica-originating peaks, considered as 100. It implies with such a peak strength ratio that the colloidal silica, when used for polishing, has a high density at around the surface that directly contacts a polished surface. Table 2 below shows that the strength ratio of $Si(OH)_0$ in Example 1 is 48, whereas in Comparative Example 1, the strength ratio is 46. In other words, FIG. 1 shows that, in particular, the surface layer portion of the silica particles comprises a reduced proportion of residual silanol groups. The strength ratio above is a percentage value calculated using each peak strength ratio of $Si(OH)_2$, $Si(OH)_1$ and $Si(OH)_0$ with respect to colloidal silica-originating peaks obtained as a result of a waveform separation performed by a known NMR spectrum-analyzer.

A dried product used herein refers to a product obtained by placing, into a 50 ml porcelain crucible, 10 g of the colloidal silica of the present invention, in which the silica content was adjusted to 10 wt. %, and subjecting the obtained product to heat treatment for 10 hours on a hot plate set to a temperature of 150° C.

The polydimethylsilane usable in the present invention has a weight average molecular weight of 2,000.

The average particle diameter of the colloidal silica of the present invention is not limited, but is usually about 5 to about 200 nm, and particularly preferably 10 to 100 nm. The average particle diameter represents a primary particle diameter, which is calculated by 2727/a specific surface area value. Separately, the average particle diameter measured by a dynamic light-scattering method ("ELS8000", produced by Otsuka Electronics Co., Ltd.) represents a secondary particle diameter. A measurement sample, which is prepared by adding 200 μL of a colloidal silica to 10 mL of 0.05 wt. % aqueous sodium decyl sulfate (SDS) solution, and homogenizing the obtained product, is used in the dynamic light-scattering method.

Each amount of 1) sodium; 2) an alkaline earth metal selected from the group consisting of calcium and magnesium; and 3) a heavy metal selected from the group consisting of iron, titanium, nickel, chromium, copper, zinc, lead, silver, manganese, and cobalt, contained in the colloidal silica of the present invention is preferably 1 wt. ppm or less. When used as a polishing material for polishing an electronic material, the colloidal silica of the present invention does not preferably contain, or contains a reduced amount of, sodium, because sodium has an adverse effect on electronic materials. It is more preferable that each amount of sodium, an alkaline earth metal and a heavy metal contained in the colloidal silica of the present invention is 1 wt. ppm or less. In the present invention, heavy metals refer to metal elements having a density of 4 $g/cm^3$ or more. The limitation on contents of an alkaline earth metal and a heavy metal refer to the limitation on contents of each metal element.

The present invention also encompasses a polishing material comprising the colloidal silica of the present invention. In particular, the colloidal silica of the present invention can be suitably used as a polishing material for polishing electronic materials. Examples include silicon wafer polish; chemical mechanical polishing (CMP) in an LSI manufacturing process; photomask blank polish; hard disk polish; and the like.

Such polishing materials may be used in the same manner as known polishing materials. For example, in order to polish a silicon wafer, the concentration of the polishing material is adjusted depending on the application etc. of the silicon wafer, and is then added dropwise onto a polishing pad attached to a platen equipped with a polishing machine.

2. Production Method of Colloidal Silica

The colloidal silica of the present invention is produced by using, as a material, an alkyl silicate, which can be highly purified by distillation. Preferably used as such a silica material is tetramethyl orthosilicate, because it can be highly purified, is highly reactive, and is easily hydrolyzed even in the absence of a catalyst.

Specifically, the colloidal silica of the present invention is preferably produced in accordance with either of the following two types of production methods, i.e., a method involving a mother liquid comprising no seed particles (Production Method 1), and a method involving a mother liquid comprising seed particles (Production Method 2).

Production Method 1: Without Seed Particles

A method for producing a colloidal silica, comprising the steps of: 1) preparing a mother liquid comprising an alkali catalyst and water (a mother liquid preparation step); and 2) adding, to the mother liquid, a hydrolyzed liquid obtained by hydrolyzing an alkyl silicate (an adding step), wherein the hydrolyzed liquid is added to the mother liquid at a rate of not greater than 41 g of silica/hour/kg of mother liquid.

Production Method 2: With Seed Particles

A method for producing a colloidal silica, comprising the steps of: 1) preparing a mother liquid comprising an alkali catalyst, water and seed particles (a mother liquid preparation step); and 2) adding, to the mother liquid, a hydrolyzed liquid obtained by hydrolyzing an alkyl silicate (an adding step), wherein the hydrolyzed liquid is added to the mother liquid at a rate of not greater than $4.2 \times 10^{-3}$ g of silica/hour/$m^2$ of seed particle surface area.

Hereinafter, each step of the Production Methods 1 and 2 is described.

Mother Liquid Preparation Step

In the mother liquid preparation step, a mother liquid comprising an alkali catalyst and water is prepared. For example, a mother liquid may be prepared by adding an alkali catalyst to water.

As such an alkali catalyst, a known alkali catalyst may be utilized. In terms of avoiding the introduction of metal impurities, however, the alkali catalyst is preferably an organic base catalyst, because such a base catalyst does not contain a metal component. Examples of such organic base catalysts include nitrogen-containing organic base catalysts such as ethylenediamine, diethylenetriamine, triethylenetetramine, ammonia, urea, ethanolamine, tetramethylammonium hydroxide (TMAH), tetramethylguanidine, and the like. Preferred are low-volatile organic base catalysts, which do not undergo volatilization in the temperature range (under heating) applied in the adding step. If a base that undergoes volatilization is used, the base may be continuously added so as to maintain the pH in the reaction system. These may be used singly or in a combination of two or more. As an exception, when a colloidal silica is used as a polishing material, KOH may be included therein as a component. For such a polishing material having such a composition, KOH may be used as an alkali catalyst.

The alkali catalyst may be added to the mother liquid so that the pH thereof is usually within the range of 7 to 14, preferably 7 to 12, and more preferably 7 to 9.

In the present invention, the mother liquid may comprise seed particles (Production Method 2). The presence of seed particles facilitates particle precipitation from a hydrolyzed liquid during the adding step described below; thereby, a colloidal silica having a large particle diameter can be obtained within a short period of time. The average particle diameter of the seed particles is, although it depends on the particle diameter of a desired colloidal silica, generally preferably about 5 to about 200 nm. As such seed particles, a commercially available colloidal silica, silica sol, and the like can be utilized. Particles other than silica may be utilized as the seed particles. For example, particles that may be utilized include inorganic particles such as titania, zirconia, alumina, and the like; and organic particles on whose surfaces a silica affinity treatment is applied. The amount of the seed particles contained in the mother liquid is not particularly restricted.

In the present invention, the mother liquid is preferably preliminarily heated before the alkyl silicate hydrolyzed liquid described later is added thereto. In particular, the mother liquid is preferably made to be in reflux state (water circulation) by heating. The reflux can be made using known equipment. The higher reaction temperature can produce denser particles. Therefore, the adding step may be performed under pressure so that the reaction mixture can be refluxed at a higher temperature. Known equipment such as autoclaves can be used therefor.

Adding Step

In an adding step, an alkyl silicate (preferably tetramethyl orthosilicate) hydrolyzed liquid (hereinafter simply referred to as a "hydrolyzed liquid") is added to the above-mentioned mother liquid.

The hydrolyzed liquid is prepared by hydrolyzing an alkyl silicate with purified water. Specifically, when tetramethyl orthosilicate is used as an alkyl silicate, an equimolar amount or more of water relative to methoxy group is added so as to allow the following reaction to be performed; thereby, an active silicic acid solution is prepared.

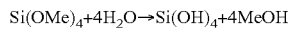

$$Si(OMe)_4 + 4H_2O \rightarrow Si(OH)_4 + 4MeOH$$

wherein Me represents a methyl group.

The alkyl silicate hydrolyzed liquid may be prepared using a known method; for example, by adding an alkyl silicate to water, and stirring the resulting mixture. With respect to the thus-obtained liquid reaction mixture, hydrolysis will progress in about 1 to 2 hours, and a desired hydrolyzed liquid can thereby be prepared.

The amount of an alkyl silicate added to water is determined so that a final silica concentration of the hydrolyzed liquid is usually 1 to 20 wt. %, preferably 1 to 10 wt. %, and more preferably 1 to 6 wt. %. Thereby, silica particles can effectively grow while preventing the alkyl silicate hydrolyzed liquid from turning into a gel.

Further, in the present invention, a water-soluble organic solvent may be added, where required, as a compatibilizing solvent, to the liquid reaction mixture in place of a part of water, in order to render the alkyl silicate compatible with water. Such a water-soluble organic solvent may be, for example, an alcohol. Specific examples include lower alcohols (in particular, alcohols having a carbon number of from 1 to 3) such as methanol, ethanol, isopropanol, and the like. The amount of such a water-soluble organic solvent contained in a liquid reaction mixture is not limited; it is, however, usually 0 to 90 wt. %, preferably about 0 to about 50 wt. %.

The alkyl silicate hydrolyzed liquid is low in storage stability. Therefore, the alkyl silicate hydrolyzed liquid may be prepared, depending on the solids content concentration, once every 2 to 10 hours, or continuously while continuing the supply thereof to the mother liquid. The storage stability can be improved by adding the foregoing compatibilizing solvent. Therefore, the amount of the compatibilizing solvent added is determined while also taking this respect into consideration.

In the present invention, hydrolysis may be performed either in the presence or the absence of a catalyst. When a catalyst is used, an inorganic acid or organic acid such as sulfuric acid, hydrochloric acid, nitric acid, acetic acid, and the like; or like a solid acid such as strongly acidic cation exchange resins, may be utilized as an acid catalyst. In the present invention, hydrolysis is preferably performed in the absence of a catalyst from the viewpoint of avoiding the introduction of impurities. The tetramethyl orthosilicate (TMOS) is easily hydrolyzed, even in the absence of a catalyst.

The alkyl silicate hydrolyzed liquid is continuously added to the mother liquid until the colloidal particles grow to a desired particle diameter. The addition rate of the hydrolyzed liquid may be adjusted to a rate that is sufficient to obtain dense silica particles, although this rate varies depending on the hydrolyzed liquid concentration, desired colloidal particle diameter, etc. When seed particles are not utilized (Production Method 1), the addition rate is preferably not greater than 41 g of silica/hour/kg of mother liquid. When seed particles are utilized (Production Method 2), the addition rate is preferably not greater than $4.2 \times 10^{-3}$ g of silica/hour/$m^2$ of seed particle surface area. The term "g of silica" used herein refers to the weight of silica; the team "kg of mother liquid" refers to the weight of mother liquid; and the term "$m^2$ of seed particle surface area" refers to the surface area of seed particles.

When seed particles are not utilized, it is presumed that seed particles are first formed in the mother liquid comprising water and an alkali catalyst, and that the particles will start growing thereafter. The number of, the seed particles formed is determined in accordance with the amount of the alkyl silicate hydrolyzed liquid (the concentration) added in early stages. Therefore, the ratio of the mother liquid charged weight to the addition rate of the alkyl silicate hydrolyzed liquid serves as a parameter. Conversely, when seed particles are utilized, silica deposits on the surfaces of the seed particles charged. Therefore, the ratio of the seed particle surface area to the addition rate of the alkyl silicate hydrolyzed liquid serves as a parameter.

When the addition rate is too fast, particles grow before forming a dense structure (when silanol groups remain), increasing the peak area value. Further, because deposition on the particle surfaces cannot be performed in time, particles may be newly formed, which leads to a wide distribution of particle sizes, resulting in an increased CV value, or the occurrence of gelation throughout the entire product. Accordingly, an overly fast addition rate also deteriorates other properties such as filterability, etc. Conversely, when the addition rate is slow, particles will be denser and more uniform; however, the productivity is decreased, and thus this is uneconomical. The practical addition rate is not less than 0.7 g of silica/hour/kg of mother liquid, or not less than $0.2 \times 10^{-3}$ g of silica/hour/$m^2$ of seed particle surface area.

Upon the addition of the alkyl silicate hydrolyzed liquid, the pH of the liquid reaction mixture gradually decreases. The liquid reaction mixture must always be observed so as to maintain the pH value within a range from 7 to 10 by properly adding an alkali catalyst. When the pH is lowered to the acidic region, the liquid reaction mixture may turn into a gel. When the obtained product is required to have a, near-neutral pH, the reaction may be carried out by gradually lowering the pH value.

The addition of the hydrolyzed liquid is halted when a colloidal particle having a desired particle diameter is produced. If required, the alcohol remaining in the liquid reaction mixture may be removed by distillation, or the like. In such a case, a decrease of the reaction temperature can be prevented by continuously removing the water-soluble organic solvent (alcohol etc.). It is preferable to promptly distill excess amounts of the water-soluble organic solvent (alcohol etc.) out of the reaction system, because the presence of a large amount of the water-soluble organic solvent (alcohol etc.) in the adding step interferes with the deposition of silica by, for example, causing the silicic acid to dissolve. By distilling excess water-soluble organic solvent out of the reaction system, the concentration described below can be performed simultaneously therewith. The liquid reaction mixture may be concentrated to a solids content of 25% or more when the reaction is completed.

Subsequently, the liquid reaction mixture is concentrated, if required. Prior to the concentration, a small amount of the water-soluble organic solvent (alcohol etc.), which remains in the reaction system, may be removed, where required.

The liquid reaction mixture may be directly subjected to concentration to a desired solids content after it is confirmed that the temperature (the temperature in the reaction system) reaches 100° C.; that the vapor temperature also reaches 100° C.; and that the removal of the water-soluble organic solvent is completed. Examples of employable concentration methods include known concentration methods such as a concentration by distillation method, a membrane concentration method, and the like. When a concentration by distillation method is employed, it is preferable that the liquid reaction mixture is fed (supplied) to a container having a specified storage capacity to prevent the occurrence of dry boiling at the wall surface, and to prevent the formation of dry particles. The resulting concentrate can be directly used for various purposes after being filtrated through a specified filter to remove coarse particles, foreign bodies, and the like.

EXAMPLES

Hereinafter, the present invention is described in further detail with reference to the Examples and Comparative Examples. However, the present invention is not limited thereto.

Example 1

An amount of 51.3 g of tetramethyl orthosilicate (TMOS) was measured and transferred into an Erlenmeyer flask (volume: 1 L), to which 623.7 g of purified water was added under stirring. The obtained liquid reaction mixture was opaque at the beginning, but became, after 5 minutes, a transparent homogeneous solution, as the hydrolysis progressed. The reaction was continued for 1 hour, and a hydrolyzed TMOS liquid containing 3 wt. % of silica was prepared. The hydrolyzed liquid was acidic due to the silanol groups produced during hydrolysis, and therefore, the pH was about 4.4.

An amount of 891 g of purified water and 0.1 g of 1N-TMAH (tetramethyl ammonium hydroxide) were added into a four-necked flask (3 liter) equipped with a feed tube, a stirrer and a packed column (filled with 5 mm glass Rashig rings; filling height: 30 cm) provided with a thermometer and a reflux head, so as to yield a mother liquid. The yielded mother liquid was then heated. When the heated mother liquid reached a refluxing state, the hydrolyzed TMOS liquid feed commenced. The addition rate was 3.3 mL/minute (6.9 g of silica/hour/kg of mother liquid).

The hydrolyzed TMOS liquid was prepared 4 times to be fed. The time required for the feed was 13.1 hours in total. During the feed, 1N-TMAH was added so as to maintain the pH at about 8. The amount of the 1N-TMAH added was 6.1 g.

The obtained colloidal silica liquid was subjected to concentration by distillation while being fed to a flask (volume: 0.5 L) equipped with a side-arm tube (a tube having a branched tube), a thermometer and a feed tube. Thereby, 474 g of the target colloidal silica was obtained.

Figure 4:
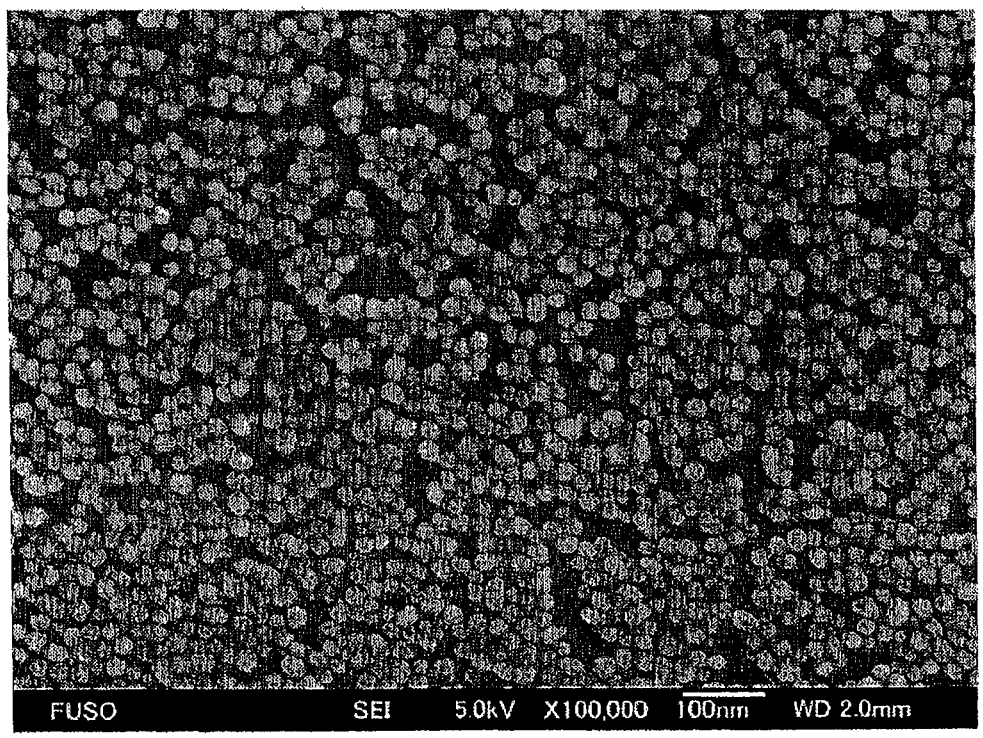
FIG. 4 is an image showing the results of scanning electron microscopic observation of the colloidal silica obtained in Example 1.

The properties of the obtained colloidal silica were analyzed. Table 2 shows the results. Table 2 also shows the results of Comparative Example 1 obtained in accordance with the solid-state $^{29}$Si-CP/MAS-NMR spectrum with respect to a commercially available colloidal silica (Fuso Chemical Co., Ltd.; PL-2L). FIG. 1 (Example 1) and FIG. 2 (Comparative Example 1) show the solid-state $^{29}$Si-CP/MAS-NMR spectrums with respect to dried products obtained by subjecting the colloidal silica prepared in Example 1 and Comparative Example 1 to heat treatment at 150° C. for 10 hours. FIG. 4 shows a scanning electron microscope (SEM) image (Example 1).

TABLE 2

| Item | | | | Example 1 |
|---|---|---|---|---|
| Final pH | | | | 7.51 |
| Specific Surface Area (m$^2$/g) | | | | 126.25 |
| Primary Particle Diameter (nm) | | | | 21.6 |
| Secondary Particle Diameter (nm) | | | | 27.9 |
| Standard Deviation | | | | 6.8 |
| Aggregate Ratio* | | | | 1.29 |
| Specific Gravity | | | | 1.098 |
| Electric Conductivity (μS/cm) | | | | — |
| Kinematic Viscosity (mm$^2$/s) | | | | — |
| Silica Content (%) | | | | 16.4 |
| Solid-State $^{29}$Si-CP/MAS-NMR Peak Strength Ratio | Si(OH)$_2$ | Si(OH)$_1$ | Si(OH)$_0$ | Peak Area Value |
| | 4 | 48 | 48 | 10.1 |
| Comparative Example 1 Peak Strength Ratio | 5 | 49 | 46 | 47.8 |
| Example 1: SEM Image | | | | See FIG. 4 |
| CV Value | | | | 24.4 |
| Metal Impurities (ppb) | | | | |
| Sodium | | | | 671.4 |
| Potassium | | | | 107.2 |
| Iron | | | | 12.1 |
| Aluminium | | | | 99.9 |
| Calcium | | | | 305.4 |
| Magnesium | | | | 72.2 |
| Titanium | | | | 2.82 |
| Nickel | | | | 0.5 |
| Chromium | | | | <0.1 |
| Copper | | | | 2.2 |
| Zinc | | | | 28.8 |
| Lead | | | | 0.40 |
| Silver | | | | <0.05 |
| Manganese | | | | 0.2 |
| Cobalt | | | | 0.6 |

*Aggregate Ratio refers to a value obtained by a secondary particle diameter/primary particle diameter (the same also applies to the following).

Comparative Example 2

Figure 3:
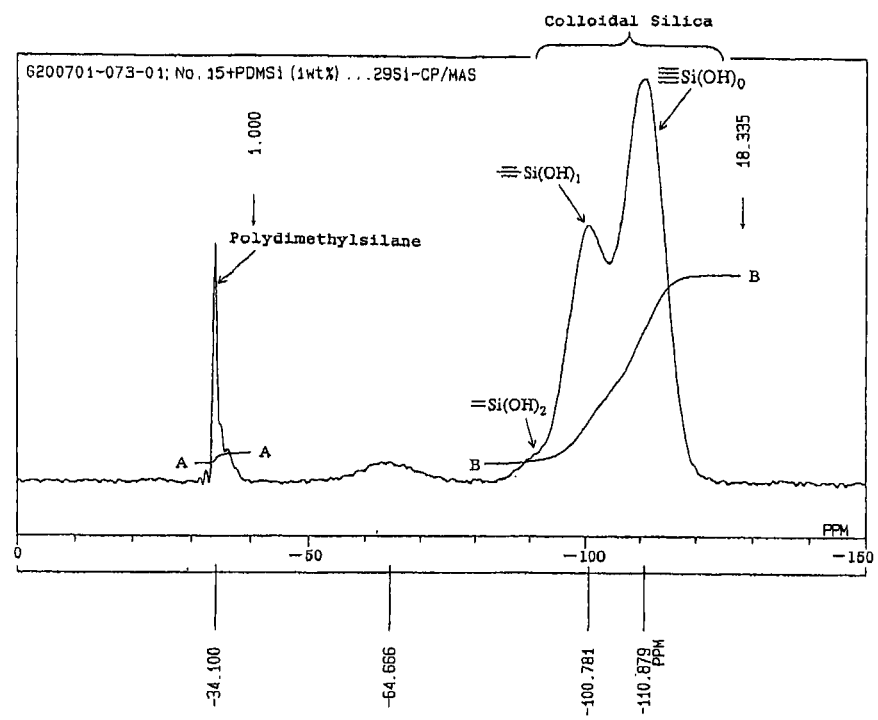
FIG. 3 is a solid-state $^{29}$Si-CP/MAS-NMR spectrum with respect to a dried product of the colloidal silica obtained in Comparative Example 2.

A silica sol was prepared in accordance with the method recited in Example 2 of Patent Document 11. The properties of the obtained silica sol were analyzed. Table 3 shows the results. FIG. 3 shows the solid-state $^{29}$Si-CP/MAS-NMR spectrum with respect to a dried product obtained by subjecting the silica sol prepared in Comparative Example 2 to heat treatment at 150° C. for 10 hours. The silica addition rate was 46.7 g of silica/hour/kg of mother liquid.

Figure 5:
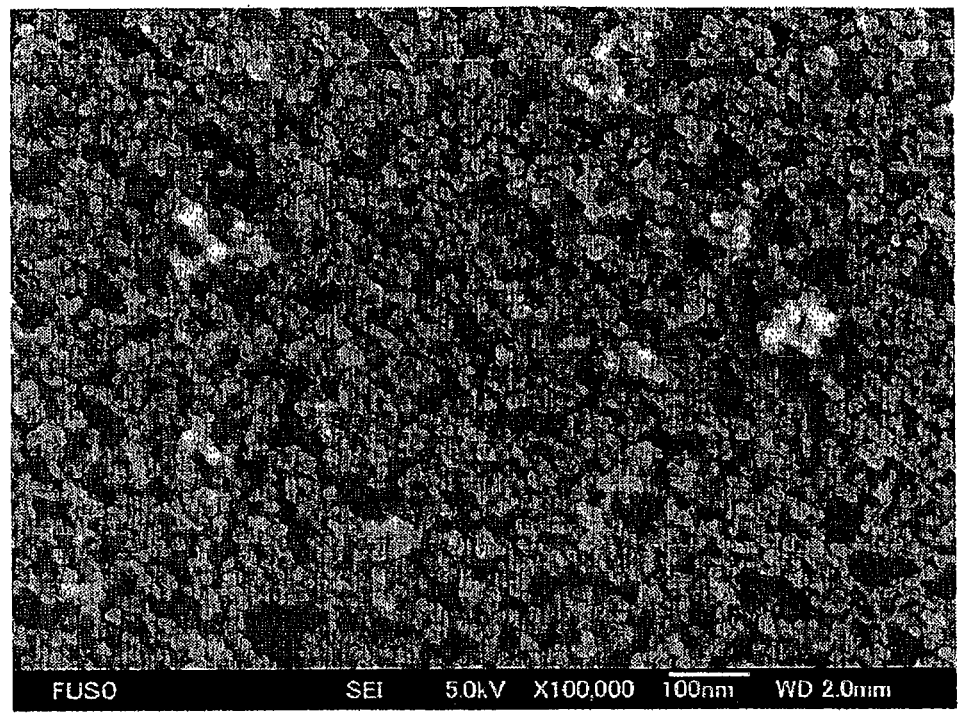
FIG. 5 is an image showing the results of scanning electron microscopic observation of the colloidal silica obtained in Comparative Example 2.

As is shown in Table 3, the results of the solid-state $^{29}$Si-CP/MAS-NMR spectrum confirm that the peak area value is as large as 18.3. Further, it is also confirmed from the results of metal analysis and electric conductivity data that the obtained product contains a large number of metal impurities and anion impurities. This is presumably because an ethyl silicate oligomer, which ultimately cannot be purified by distillation, was used as a starting material; and because a nitric acid was added as an acid catalyst. The aggregate ratio was high. Further, as is clear from the SEM image of FIG. 5, it appears that thin and long particles, which are the target product of Patent Document 11, were prepared.

TABLE 3

| Item | Comparative Example 2 | | | |
|---|---|---|---|---|
| Final pH | 9.45 | | | |
| Specific Surface Area (m²/g) | 180.40 | | | |
| Primary Particle Diameter (nm) | 15.1 | | | |
| Secondary Particle Diameter (nm) | 78.5 | | | |
| Standard Deviation | 46.9 | | | |
| Aggregate Ratio | 5.20 | | | |
| Specific Gravity | 1.048 | | | |
| Electric Conductivity (µS/cm) | 692 | | | |
| Kinematic Viscosity (mm²/s) | 1.3 | | | |
| Silica Content (%) | 10.2 | | | |
| Solid-State $^{29}$Si-CP/MAS-NMR Peak Strength Ratio | Si(OH)$_2$<br>3 | Si(OH)$_1$<br>36 | Si(OH)$_0$<br>61 | Peak Area Value<br>18.3 |
| Comparative Example 2: SEM Image | See FIG. 5 | | | |
| CV Value | 59.7 | | | |
| Metal Impurities (ppb) | | | | |
| Sodium | 750.5 | | | |
| Potassium | 33.3 | | | |
| Iron | 10.6 | | | |
| Aluminium | 805.0 | | | |
| Calcium | 46.6 | | | |
| Magnesium | 16.4 | | | |
| Titanium | 781.3 | | | |
| Nickel | 0.8 | | | |
| Chromium | 24.8 | | | |
| Copper | 1.9 | | | |
| Zinc | 22.1 | | | |
| Lead | 0.3 | | | |
| Silver | <0.05 | | | |
| Manganese | 0.3 | | | |
| Cobalt | <0.1 | | | |

Example 2

An amount of 68.4 g of tetramethyl orthosilicate (TMOS) was measured and transferred into an Erlenmeyer flask (volume: 1 L), to which 831.6 g of purified water was added under stirring. The obtained liquid reaction mixture was opaque at the beginning, but became, after 5 minutes, a transparent homogeneous solution, as the hydrolysis progressed. The reaction was continued for 1 hour, and a hydrolyzed TMOS liquid containing 3 wt. % of silica was prepared. The hydrolyzed liquid was acidic due to the silanol groups produced during hydrolysis, and therefore, the pH was about 4.5.

An amount of 594 g of purified water and 0.05 g of 1N-TMAH were added into a four-necked flask (2 liter) equipped with a feed tube, a stirrer and a packed column (filled with 5 mm glass Rashig rings; filling height: 30 cm) provided with a thermometer and a reflux head, so as to yield a mother liquid. The yielded mother liquid was then heated. When the heated mother liquid reached a refluxing state, the hydrolyzed TMOS liquid feed commenced. The addition rate was 5.0 mL/minute (14.0 g of silica/hour/kg of mother liquid).

The hydrolyzed TMOS liquid was prepared twice to be fed. The time required for the feed was 6.4 hours in total. During the feed, 1N-TMAH was added so as to maintain the pH at about 9. The amount of the 1N-TMAH added was 13.0 g.

The obtained colloidal silica liquid was subjected to concentration by distillation while being fed to a flask (volume: 0.5 L) equipped with a side-arm tube, a thermometer and a feed tube. Thereby, 529 g of the target colloidal silica was obtained.

Figure 6:
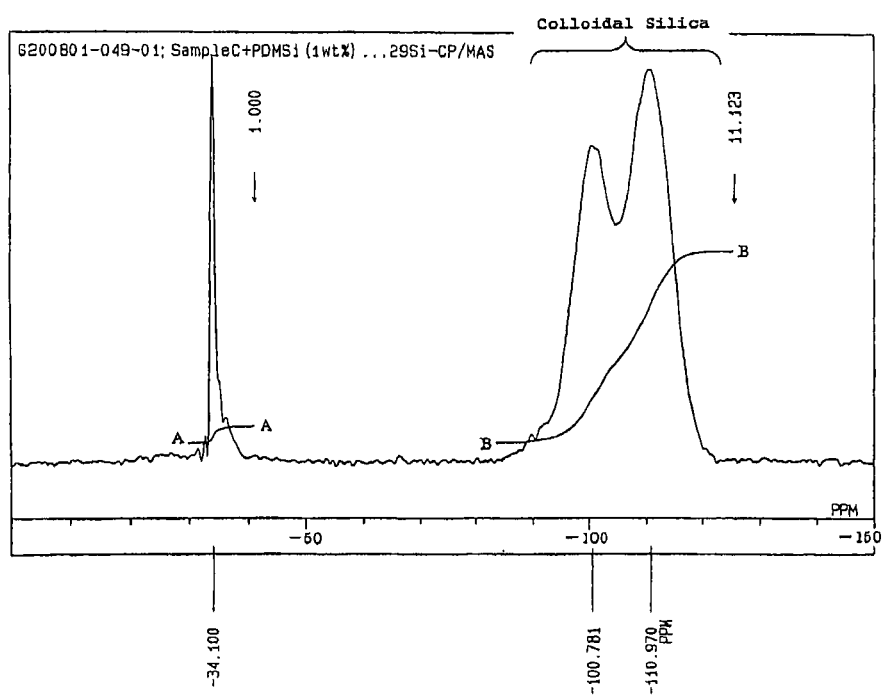
FIG. 6 is a solid-state $^{29}$Si-CP/MAS-NMR spectrum with respect to a dried product of the colloidal silica obtained in Example 2.
Figure 7:
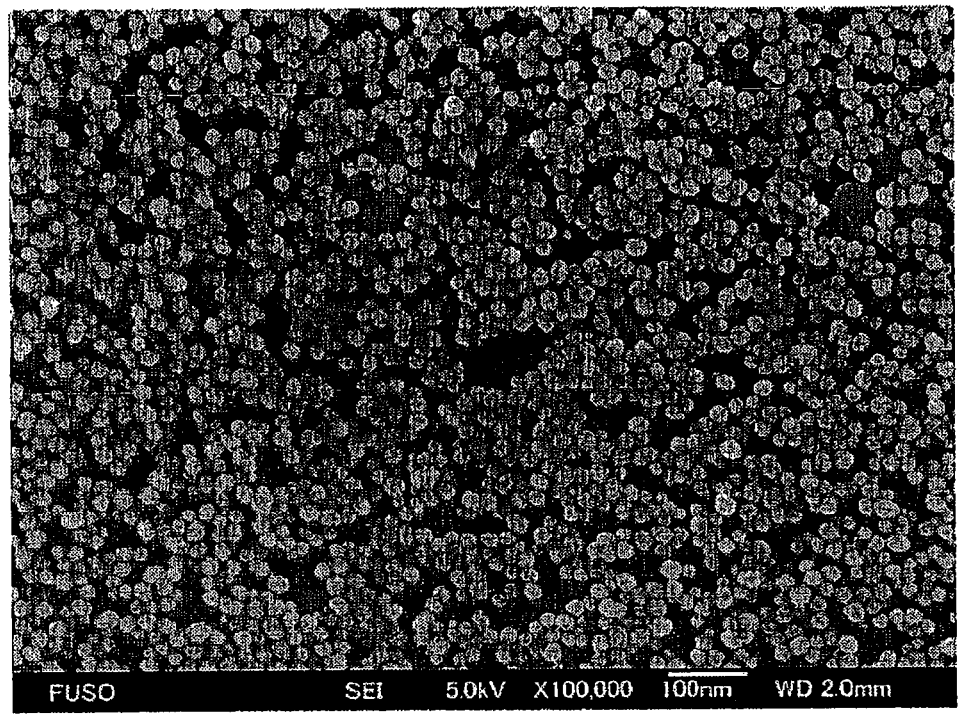
FIG. 7 is an image showing the results of scanning electron microscopic observation of the colloidal silica obtained in Example 2.

The properties of the obtained colloidal silica were analyzed. Table 4 shows the results. FIG. 6 shows the solid-state $^{29}$Si-CP/MAS-NMR spectrums with respect to a dried product obtained by subjecting the colloidal silica prepared in Example 2 to heat treatment at 150° C. for 10 hours. FIG. 7 shows a scanning electron microscope (SEM) image with respect to the colloidal silica of Example 2.

The seed particles were not used, and the addition rate was set to about twice as fast as the rate applied in Example 1. As a result, the peak area value was slightly increased. This confirms that the amount of silanol groups was increased.

TABLE 4

| Item | Example 2 | | | |
|---|---|---|---|---|
| Final pH | 9.04 | | | |
| Specific Surface Area (m²/g) | 144.60 | | | |
| Primary Particle Diameter (nm) | 18.9 | | | |
| Secondary Particle Diameter (nm) | 25.7 | | | |
| Standard Deviation | 6.1 | | | |
| Aggregate Ratio* | 1.36 | | | |
| Specific Gravity | 1.055 | | | |
| Electric Conductivity (µS/cm) | 72.2 | | | |
| Kinematic Viscosity (mm²/s) | 1.8 | | | |
| Silica Content (%) | 9.65 | | | |
| Solid-State $^{29}$Si-CP/MAS-NMR Peak Strength Ratio | Si(OH)$_2$<br>2 | Si(OH)$_1$<br>40 | Si(OH)$_0$<br>57 | Peak Area Value<br>11.1 |
| Example 2: SEM Image | See FIG. 7 | | | |
| CV Value | 23.7 | | | |
| Metal Impurities (ppb) | | | | |
| Sodium | 671.4 | | | |
| Potassium | 107.2 | | | |
| Iron | 12.1 | | | |
| Aluminium | 99.9 | | | |

TABLE 4-continued

| | |
|---|---|
| Calcium | 305.4 |
| Magnesium | 72.2 |
| Titanium | 2.82 |
| Nickel | 0.5 |
| Chromium | <0.1 |
| Copper | 2.2 |
| Zinc | 28.8 |
| Lead | 0.40 |
| Silver | <0.05 |
| Manganese | 0.2 |
| Cobalt | 0.6 |

Example 3

An amount of 205.2 g of tetramethyl orthosilicate (TMOS) was measured and transferred into an Erlenmeyer flask (volume: 3 L), to which 2,494.8 g of purified water was added under stirring. The obtained liquid reaction mixture was opaque at the beginning, but became, after 5 minutes, a transparent homogeneous solution, as the hydrolysis progressed. The reaction was continued for 1 hour, and a hydrolyzed TMOS liquid containing 3 wt. % of silica was prepared. The hydrolyzed liquid was acidic due to the silanol groups produced during hydrolysis, and therefore, the pH was about 4.4.

An amount of 891 g of purified water and 0.16 g of 1N-TMAH were added into a four-necked flask (2 liter) equipped with a feed tube, a stirrer and a packed column (filled with 5 mm glass Rashig rings; filling height: 30 cm) provided with a thermometer and a reflux head, so as to yield a mother liquid. The yielded mother liquid was then heated. When the heated mother liquid reached a refluxing state, the hydrolyzed TMOS liquid feed commenced. The addition rate was 11.3 mL/minute (20.0 g of silica/hour/kg of mother liquid).

The hydrolyzed TMOS liquid was prepared once to be fed. The time required for the feed was 4.5 hours in total. During the feed, 1N-TMAH was added so as to maintain the pH at about 8. The amount of the 1N-TMAH added was 10.0 g.

The obtained colloidal silica liquid was subjected to concentration by distillation while being fed to a flask (volume: 0.5 L) equipped with a side-arm tube, a thermometer and a feed tube. Thereby, 487.3 g of the target colloidal silica was obtained.

Figure 8:
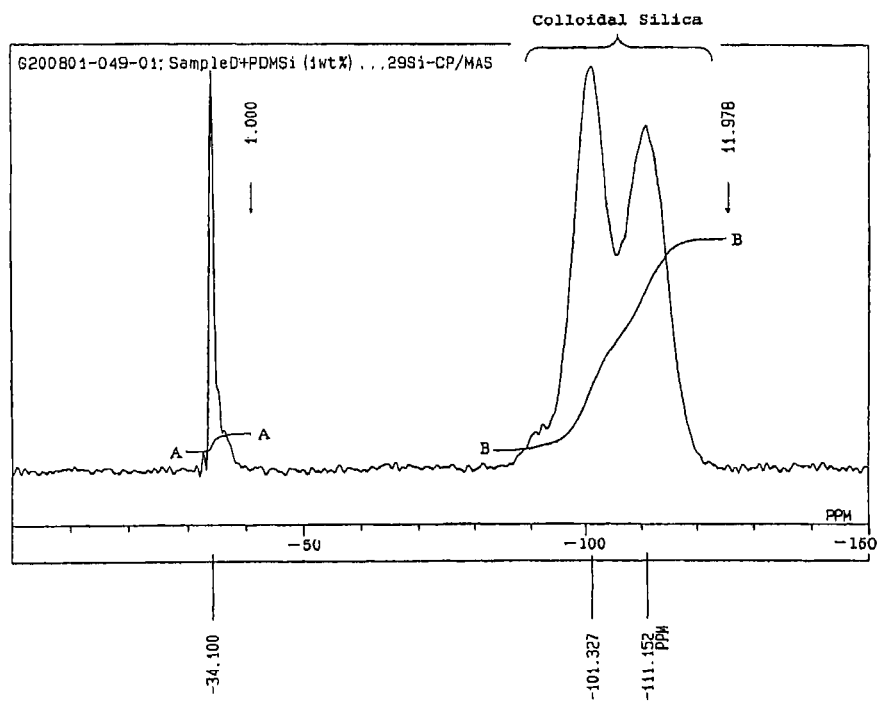
FIG. 8 is a solid-state $^{29}$Si-CP/MAS-NMR spectrum with respect to a dried product of the colloidal silica obtained in Example 3.
Figure 9:
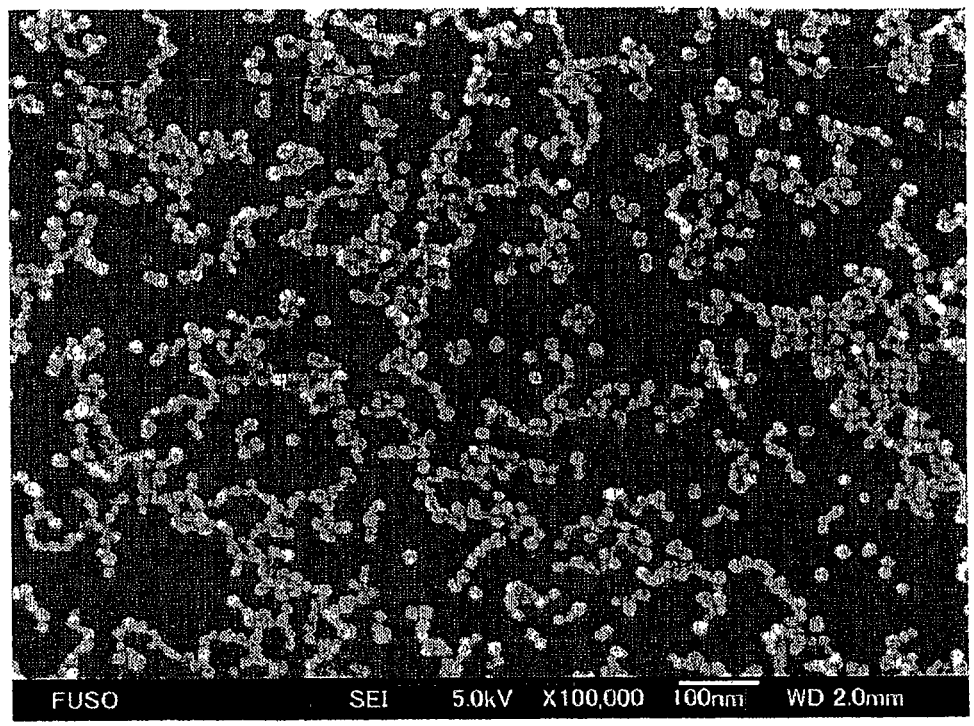
FIG. 9 is an image showing the results of scanning electron microscopic observation of the colloidal silica obtained in Example 3.

The properties of the obtained colloidal silica were analyzed. Table 5 shows the results. FIG. 8 shows the solid-state $^{29}$Si-CP/MAS-NMR spectrums with respect to a dried product obtained by subjecting the colloidal silica prepared in Example 3 to heat treatment at 150° C. for 10 hours. FIG. 9 shows a scanning electron microscope (SEM) image with respect to the colloidal silica of Example 3.

The seed particles were not used, and the addition rate was set to about three times faster than the rate applied in Example 1. As a result, the obtained particles had a smaller diameter, and the peak area value was slightly increased, confirming that the amount of silanol groups was increased. This is presumably because the increase of the addition rate increased the number of seed particles produced, and because silanol groups were likely to remain therein because of the increase of the silica growth rate.

TABLE 5

| Item | Example 3 | | | |
|---|---|---|---|---|
| Final pH | 7.60 | | | |
| Specific Surface Area (m²/g) | 201.92 | | | |
| Primary Particle Diameter (nm) | 13.5 | | | |
| Secondary Particle Diameter (nm) | 22.0 | | | |
| Standard Deviation | 11.9 | | | |
| Aggregate Ratio* | 1.63 | | | |
| Specific Gravity | 1.090 | | | |
| Electric Conductivity (μS/cm) | 212 | | | |
| Kinematic Viscosity (mm²/s) | — | | | |
| Silica Content (%) | 15.21 | | | |
| Solid-State $^{29}$Si-CP/MAS-NMR Peak Strength Ratio | Si(OH)$_2$ 4 | Si(OH)$_1$ 45 | Si(OH)$_0$ 51 | Peak Area Value 12.0 |
| Example 3: SEM Image | See FIG. 9 | | | |
| CV Value | 54.1 | | | |
| Metal Impurities (ppb) | | | | |
| Sodium | 650.2 | | | |
| Potassium | 116.2 | | | |
| Iron | 15.0 | | | |
| Aluminium | 76.4 | | | |
| Calcium | 200.0 | | | |
| Magnesium | 80.4 | | | |
| Titanium | 2.93 | | | |
| Nickel | 0.7 | | | |
| Chromium | <0.1 | | | |
| Copper | 2.7 | | | |
| Zinc | 30.7 | | | |
| Lead | 0.45 | | | |
| Silver | <0.05 | | | |
| Manganese | 0.3 | | | |
| Cobalt | 0.6 | | | |

Example 4

An amount of 34.2 g of tetramethyl orthosilicate (TMOS) was measured and transferred into an Erlenmeyer flask (volume: 1 L), to which 415.8 g of purified water was added under stirring. The obtained liquid reaction mixture was opaque at the beginning, but became, after 5 minutes, a transparent homogeneous solution, as the hydrolysis progressed. The reaction was continued for 1 hour, and a hydrolyzed TMOS liquid containing 3 wt. % of silica was prepared. The hydrolyzed liquid was acidic due to the silanol groups produced during hydrolysis, and therefore, the pH was about 4.1.

An amount of 594 g of purified water and 0.1 g of 1N—KOH were added into a four-necked flask (2 liter) equipped with a feed tube, a stirrer and a packed column (filled with 5 mm glass Rashig rings; filling height: 30 cm) provided with a thermometer and a reflux head, so as to yield a mother liquid. The yielded mother liquid was then heated. When the heated mother liquid reached a refluxing state, the hydrolyzed TMOS liquid feed commenced. The addition rate was 2.5 mL/minute (7.81 g of silica/hour/kg of mother liquid).

The hydrolyzed TMOS liquid was prepared 4 times to be fed. The time required for the feed was 11.5 hours in total. During the feed, 1 g each of 1N—KOH was added so as to maintain the pH at about 8. The amount of the 1N—KOH added was 2.1 g.

The obtained colloidal silica liquid was subjected to concentration by distillation while being fed to a flask (volume: 0.5 L) equipped with a side-arm tube, a thermometer and a feed tube. Thereby, 501 g of the target colloidal silica was obtained.

Figure 10:
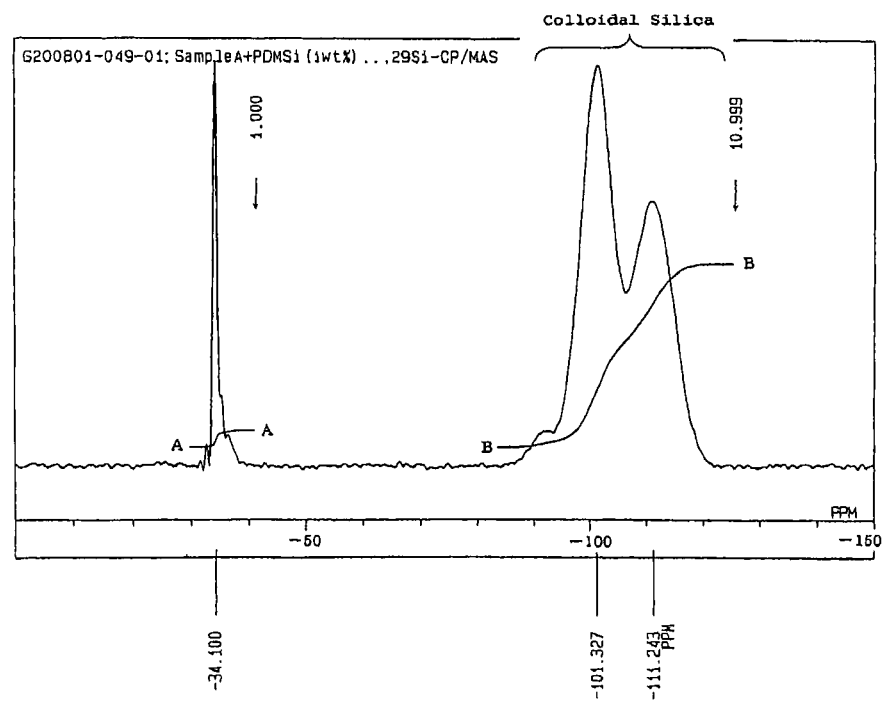
FIG. 10 is a solid-state $^{29}$Si-CP/MAS-NMR spectrum with respect to a dried product of the colloidal silica obtained in Example 4.
Figure 11:
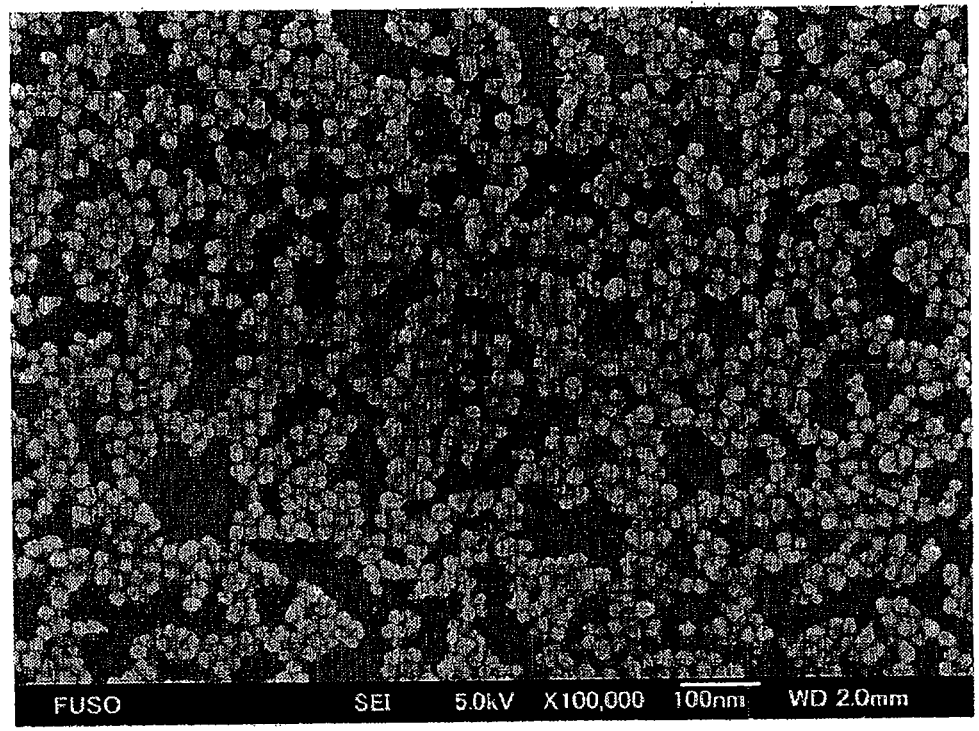
FIG. 11 is an image showing the results of scanning electron microscopic observation of the colloidal silica obtained in Example 4.

The properties of the obtained colloidal silica were analyzed. Table 6 shows the results. FIG. 10 shows the solid-state $^{29}$Si-CP/MAS-NMR spectrums with respect to a dried product obtained by subjecting the colloidal silica prepared in Example 4 to heat treatment at 150° C. for 10 hours. FIG. 11 shows a scanning electron microscope (SEM) image with respect to the colloidal silica of Example 4.

As in the case where a pH adjustment was performed using 1N-TMAH, a colloidal silica in which the peak area was about 11 was obtained. The Si(OH)$_0$ peak strength was as small as 45.

TABLE 6

| Item | Example 4 | | | |
|---|---|---|---|---|
| Final pH | 7.98 | | | |
| Primary Particle Diameter (nm) | 20.6 | | | |
| Secondary Particle Diameter (nm) | 26.7 | | | |
| Standard Deviation | 8.2 | | | |
| Aggregate Ratio* | 1.30 | | | |
| Specific Gravity | 1.060 | | | |
| Electric Conductivity (μS/cm) | 221 | | | |
| Kinematic Viscosity (mm$^2$/s) | 2.1 | | | |
| Silica Content (%) | 10.50 | | | |
| Solid-State $^{29}$Si-CP/MAS-NMR Peak Strength Ratio | Si(OH)$_2$ 4 | Si(OH)$_1$ 50 | Si(OH)$_0$ 45 | Peak Area Value 11.0 |
| Example 4: SEM Image | See FIG. 11 | | | |
| CV Value | 30.7 | | | |
| Metal Impurities (ppm) | | | | |
| Sodium | 0.8 | | | |
| Potassium | 78 | | | |
| Iron | <0.05 | | | |
| Aluminium | <0.1 | | | |
| Calcium | 0.2 | | | |
| Magnesium | 0.03 | | | |
| Titanium | <0.01 | | | |
| Nickel | <0.1 | | | |
| Chromium | <0.01 | | | |
| Copper | <0.1 | | | |
| Zinc | <0.01 | | | |
| Lead | <0.1 | | | |
| Silver | <0.1 | | | |
| Manganese | <0.01 | | | |
| Cobalt | <0.05 | | | |

Example 5

An amount of 57 g of tetramethyl orthosilicate (TMOS) was measured and transferred into an Erlenmeyer flask (volume: 2 L), to which 693 g of purified water was added under stirring. The obtained liquid reaction mixture was opaque at the beginning, but became, after 5 minutes, a transparent homogeneous solution, as the hydrolysis progressed. The reaction was continued for 1 hour, and a hydrolyzed TMOS liquid containing 3 wt. % of silica was prepared. The hydrolyzed liquid was acidic due to the silanol groups produced during hydrolysis, and therefore, the pH was about 4.3.

An amount of 150 g of silica particles ("PL-06L" produced by Fuso Chemical Co., Ltd., particle diameter: 6.0 nm; specific surface area: 452.3 m$^2$/g; solids content: 6.3 wt. %) was placed as seed particles in a four-necked flask (5 liter) equipped with a feed tube, a stirrer and a packed column (filled with 5 mm glass Rashig rings; filling height: 30 cm) provided with a thermometer and a reflux head, which was diluted two-fold in purified water. An aqueous tetramethylammonium hydroxide (TMAH) 1N solution was added dropwise thereto to adjust the pH to 11.6. The resulting product was introduced into a flask as a mother liquid, and heated. When the mother liquid reached a refluxing state, the hydrolyzed TMOS liquid feeding was initiated. The feed rate was 4 mL/minute. The head temperature was gradually lowered because methanol was introduced into the reaction system due to the hydrolyzed TMOS liquid feeding. When the head temperature was lowered to 90° C., the fraction was removed. While repeating the above steps, the feeding was continued so as to grow particles. The temperature in the reaction system was thereby maintained as high as 99° C. or more throughout the reaction.

Because the hydrolyzed TMOS liquid was unstable, the preparation thereof was performed once about every 3 hours, and was fed in 4 portions. The time required for the feeding was 19.7 hours in total ($1.06 \times 10^{-3}$ g of silica/hour/m$^2$ of seed particle surface area).

A pH change was observed during the hydrolyzed TMOS liquid feeding, and 1 g of an aqueous 1N-TMAH solution was added each time the pH became too low. The total amount of the aqueous 1N-TMAH solution added was 13 g. The final pH was adjusted to about 8.

The obtained colloidal silica liquid was subjected to concentration by distillation while being fed to a flask (volume: 2 L) equipped with a side-arm tube, a thermometer and a feed tube. Thereby, 1,263 g of the target colloidal silica was obtained.

Figure 12:
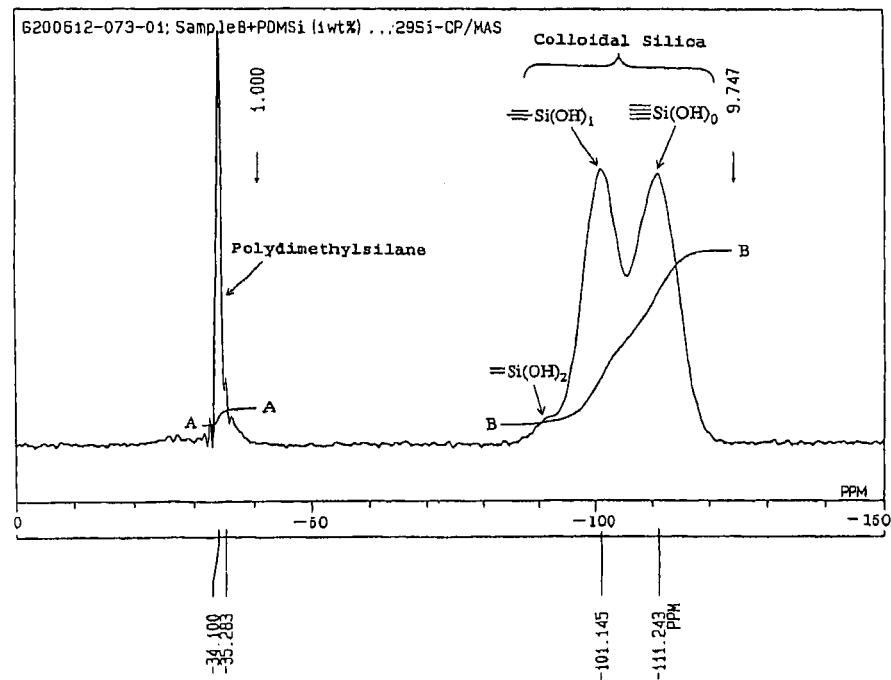
FIG. 12 is a solid-state $^{29}$Si-CP/MAS-NMR spectrum with respect to a dried product of the colloidal silica obtained in Example 5.
Figure 13:
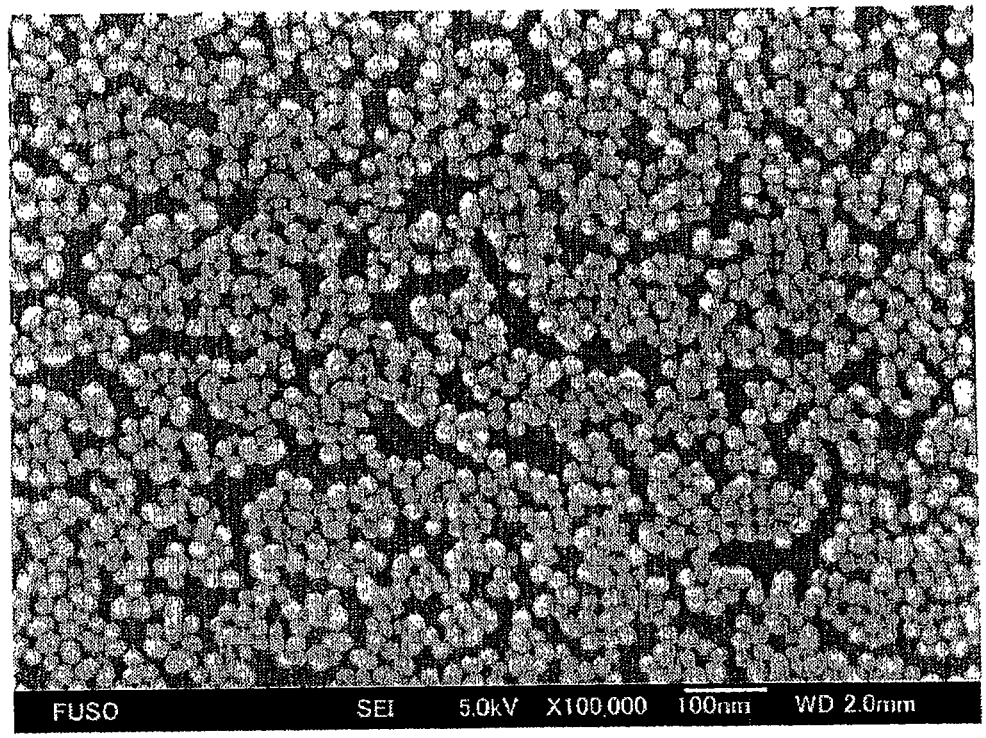
FIG. 13 is an image showing the results of scanning electron microscopic observation of the colloidal silica obtained in Example 5.

The properties of the obtained colloidal silica were analyzed. Table 7 shows the results. FIG. 12 shows the solid-state $^{29}$Si-CP/MAS-NMR spectrums with respect to a dried product obtained by subjecting the colloidal silica prepared in Example 5 to heat treatment at 150° C. for 10 hours. FIG. 13 shows a scanning electron microscope (SEM) image with respect to the colloidal silica of Example 5.

TABLE 7

| Item | Example 5 |
|---|---|
| Final pH | 7.62 |
| Specific Surface Area (m$^2$/g) | 113.35 |
| Primary Particle Diameter (nm) | 21.4 |
| Secondary Particle Diameter (nm) | 30.4 |
| Standard Deviation | 8.5 |

TABLE 7-continued

| | | | | |
|---|---|---|---|---|
| Aggregate Ratio* | 1.42 | | | |
| Specific Gravity | 1.062 | | | |
| Electric Conductivity (μS/cm) | 78.5 | | | |
| Kinematic Viscosity (mm$^2$/s) | 1.9 | | | |
| Silica Content (%) | 11.0 | | | |
| Solid-State $^{29}$Si-CP/MAS-NMR Peak Strength Ratio | | Si(OH)$_2$ 4 | Si(OH)$_1$ 44 | Si(OH)$_0$ 52 | Peak Area Value 9.7 |
| Example 5: SEM Image | See FIG. 13 | | | |
| CV Value | 28.0 | | | |
| Metal Impurities (ppb) | | | | |
| Sodium | 339.8 | | | |
| Potassium | 174.5 | | | |
| Iron | 3.4 | | | |
| Aluminium | 161.9 | | | |
| Calcium | 155.9 | | | |
| Magnesium | 32.3 | | | |
| Titanium | 1.2 | | | |
| Nickel | 0.4 | | | |
| Chromium | <0.1 | | | |
| Copper | 0.7 | | | |
| Zinc | 32.7 | | | |
| Lead | 0.62 | | | |
| Silver | <0.05 | | | |
| Manganese | 0.5 | | | |
| Cobalt | 0.2 | | | |

Example 6

The same steps were performed as in Example 5, except that the addition rate was set to 8 ml/minute, and the aqueous alkyl silicate solution was prepared twice using 114 g of TMOS and 1,386 g of water. The time required for the feed was 10.1 hours (2.07×10$^{-3}$ g of silica/hour/m$^2$ of seed particle surface area). The yield after the concentration was 643 g.

Figure 14:
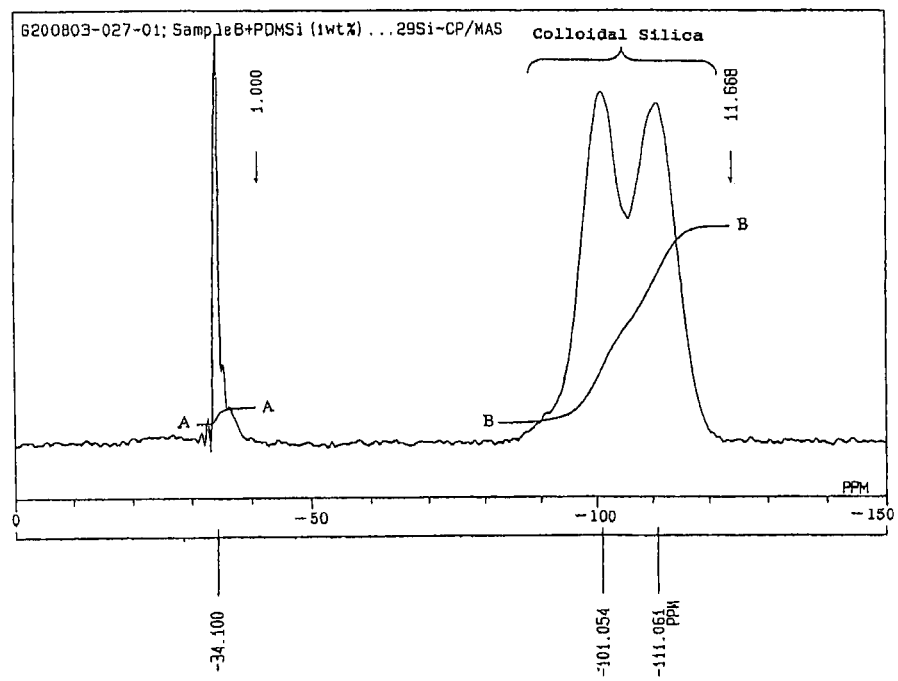
FIG. 14 is a solid-state $^{29}$Si-CP/MAS-NMR spectrum with respect to a dried product of the colloidal silica obtained in Example 6.
Figure 15:
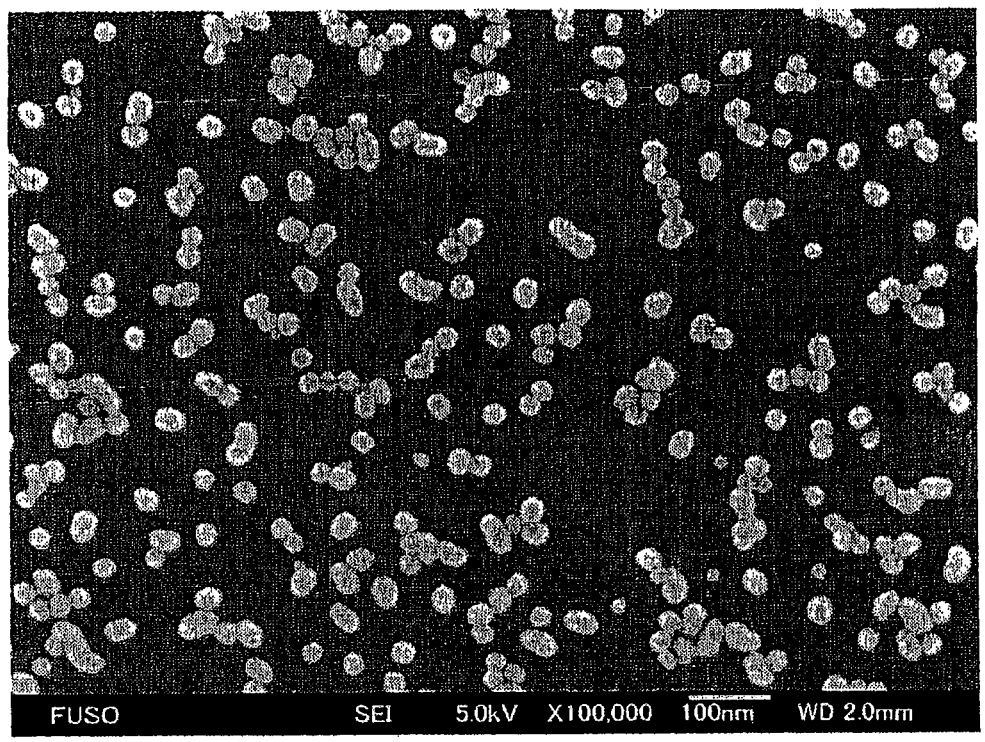
FIG. 15 is an image showing the results of scanning electron microscopic observation of the colloidal silica obtained in Example 6.

The properties of the obtained colloidal silica were analyzed. Table 8 shows the results. FIG. 14 shows the solid-state $^{29}$Si-CP/MAS-NMR spectrums with respect to a dried product obtained by subjecting the colloidal silica prepared in Example 6 to heat treatment at 150° C. for 10 hours. FIG. 15 shows a scanning electron microscope (SEM) image with respect to the colloidal silica of Example 6.

TABLE 8

| Item | Example 6 |
|---|---|
| Final pH | 7.74 |
| Specific Surface Area (m$^2$/g) | 113.87 |
| Primary Particle Diameter (nm) | 23.94 |
| Secondary Particle Diameter (nm) | 31.5 |
| Standard Deviation | 8.4 |
| Aggregate Ratio* | 1.32 |
| Specific Gravity | 1.134 |
| Electric Conductivity (μS/cm) | — |
| Kinematic Viscosity (mm$^2$/s) | 6.7 |
| Silica Content (%) | 21.61 |
| Solid-State $^{29}$Si-CP/MAS-NMR Peak Strength Ratio | Si(OH)$_2$ 4   Si(OH)$_1$ 44   Si(OH)$_0$ 52   Peak Area Value 11.7 |
| Example 6: SEM Image | See FIG. 15 |
| CV Value | 26.7 |
| Metal Impurities (ppb) | |
| Sodium | 812.2 |
| potassium | 172.9 |
| Iron | <0.5 |
| Aluminium | 131.1 |
| Calcium | 189.9 |
| Magnesium | 40.0 |
| Titanium | <0.05 |
| Nickel | 0.4 |
| Chromium | <0.1 |
| Copper | 0.2 |
| Zinc | 50.2 |
| Lead | 1.51 |
| Silver | <0.05 |
| Manganese | <0.1 |
| Cobalt | 2.2 |

Comparative Example 3

The same steps were performed as in Example 5, except that the addition rate was set to 16 ml/minute, and the aqueous active silicic acid solution was prepared once using 228 g of TMOS and 2,772 g of water. The time required for the feed was 4.7 hours (4.44×10$^{-3}$ g of silica/hour/m$^2$ of seed particle surface area). The yield after concentration was 638 g.

Figure 16:
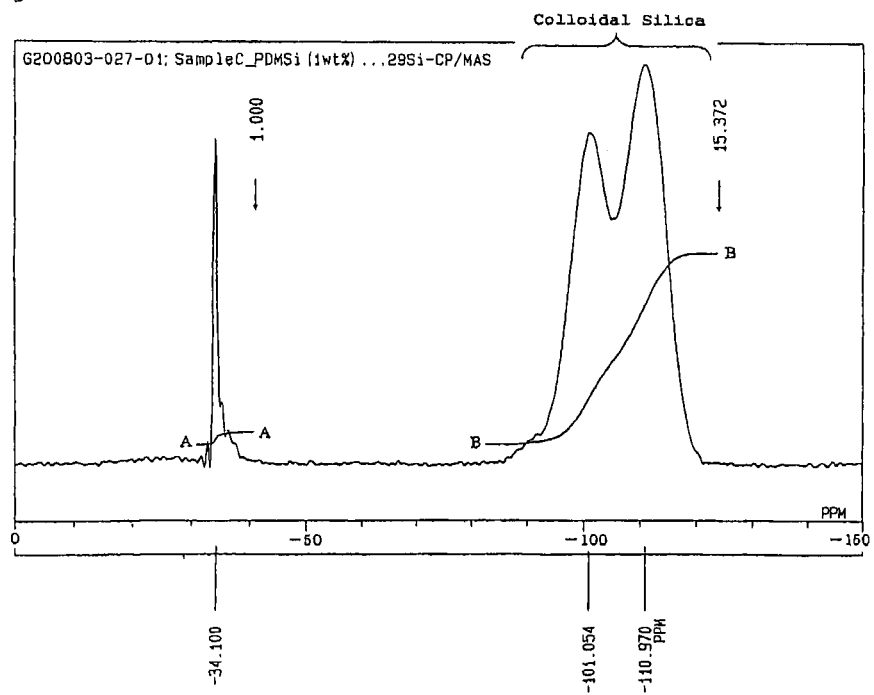
FIG. 16 is a solid-state $^{29}$Si-CP/MAS-NMR spectrum with respect to a dried product of the colloidal silica obtained in Comparative Example 3.
Figure 17:
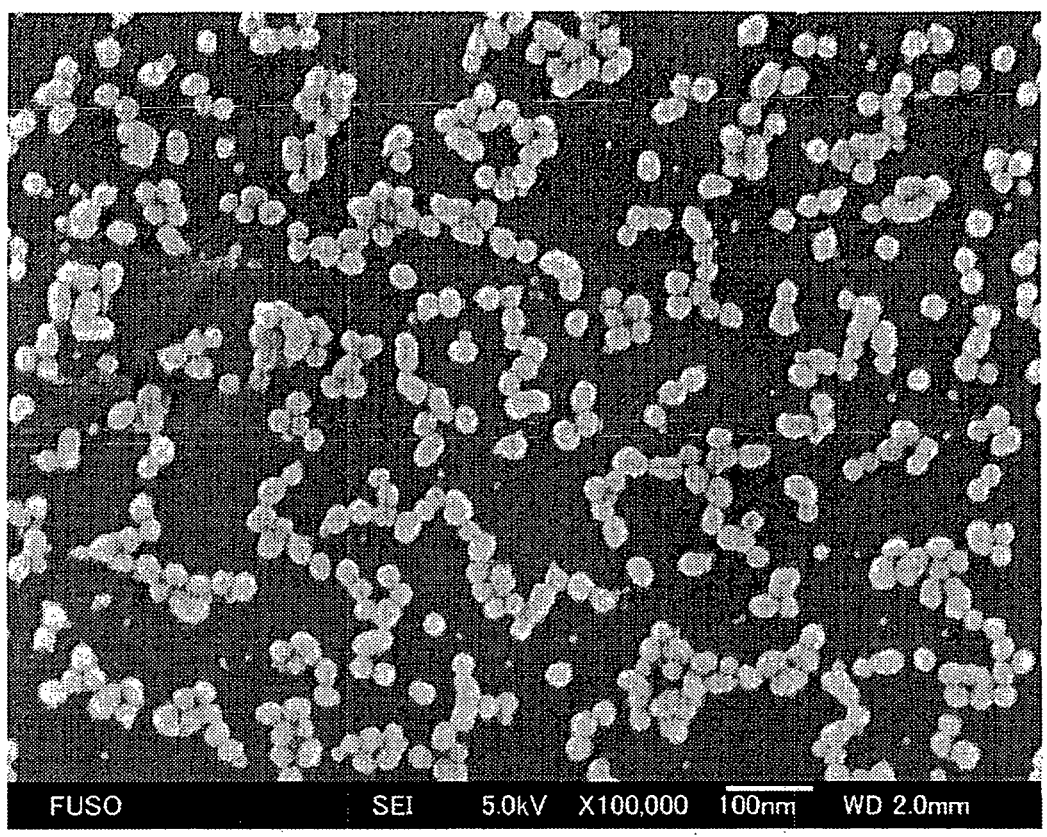
FIG. 17 is an image showing the results of scanning electron microscopic observation of the colloidal silica obtained in Comparative Example 3.

The properties of the obtained colloidal silica were analyzed. Table 9 shows the results. FIG. 16 shows the solid-state $^{29}$Si-CP/MAS-NMR spectrums with respect to a dried product obtained by subjecting the colloidal silica prepared in Comparative Example 3 to heat treatment at 150° C. for 10 hours. FIG. 17 shows a scanning electron microscope (SEM) image with respect to the colloidal silica of Comparative Example 3.

TABLE 9

| Item | Comparative Example 3 |
|---|---|
| Final pH | 7.73 |
| Specific Surface Area (m$^2$/g) | 116.20 |
| Primary Particle Diameter (nm) | 23.5 |
| Secondary Particle Diameter (nm) | 31.0 |
| Standard Deviation | 8.4 |
| Aggregate Ratio* | 1.32 |

TABLE 9-continued

| | | | | |
|---|---|---|---|---|
| Specific Gravity | | 1.133 | | |
| Electric Conductivity (μS/cm) | | — | | |
| Kinematic Viscosity (mm²/s) | | 6.1 | | |
| Silica Content (%) | | 21.4 | | |
| Solid-State ²⁹Si-CP/MAS-NMR Peak Strength Ratio | Si(OH)$_2$ 3 | Si(OH)$_1$ 40 | Si(OH)$_0$ 57 | Peak Area Value 15.4 |
| Comparative Example 3: SEM Image | | See FIG. 17 | | |
| CV Value | | 27.1 | | |
| Metal Impurities (ppb) | | | | |
| Sodium | | 424.1 | | |
| Potassium | | 97.6 | | |
| Iron | | <0.5 | | |
| Aluminium | | 87.8 | | |
| Calcium | | 226.5 | | |
| Magnesium | | 46.5 | | |
| Titanium | | <0.05 | | |
| Nickel | | 0.3 | | |
| Chromium | | <0.1 | | |
| Copper | | 0.3 | | |
| Zinc | | 21.7 | | |
| Lead | | 0.59 | | |
| Silver | | <0.05 | | |
| Manganese | | <0.1 | | |
| Cobalt | | <0.1 | | |

Tables 10 and 11 summarize the above data. It is found that as the silica deposition rate is increased, the siloxane skeleton cannot fully form; thereby the peak area is increased, and particles have a tendency to form in a state where silanol groups remain.

When seed particles are not utilized, the number of the seed particles produced varies depending on the addition rate. A low addition rate decreases the number of the seed particles produced. A high addition rate increases the number of the seed particles produced. The increased number of seed particles causes the silica deposition to be distributed, resulting in a lowered growth rate of the particles. With a few seed particles, silica will be intensively deposited thereon, increasing the growth rate of particles. Due to the above effects, an increase of the addition rate increases the particle number, thereby suppressing the increase of an NMR peak area; and a decrease of the addition rate decreases the particle number, thereby suppressing the decrease of the peak area. Accordingly, the variety in peak area results is small.

On the other hand, when the mother liquid originally contains seed particles, the number of particles, on which silica deposits, is constant. Therefore, the peak area value changes only in accordance with the addition rate, causing a wide range of change in the peak area. In Comparative Example 3, where the addition rate was quadruple that of Example 1, the peak area was greater than 15. Additionally, in Comparative Example 3, where the addition rate was quadruple that of Example 1, a small amount of fine powder was observed with SEM. In view of this, the upper limit of the addition rate is considered about this rate.

TABLE 10

Without Seed Particles

| Item | Example 1 1 times rate | Example 2 2 times rate | Example 3 3 times rate | Comparative Example 2 6 times rate |
|---|---|---|---|---|
| Addition Rate (g of Silica/Hour/kg of Mother Liquid) | 6.9 | 14.0 | 20.0 | 46.7 |
| pH | 7.51 | 9.04 | 7.60 | 9.45 |
| Specific Gravity | 1.098 | 1.055 | 1.090 | 1.048 |
| Silica Concentration (wt. %) | 16.37 | 9.65 | 15.21 | 10.2 |
| Kinematic Viscosity | — | 1.8 | 2.0 | 1.3 |
| Specific Surface Area (m²/g) | 126.25 | 144.60 | 201.92 | 180.40 |
| Primary Particle Diameter (nm) | 21.6 | 18.9 | 13.5 | 15.1 |
| Secondary Particle Diameter (nm) | 27.9 | 25.7 | 22.0 | 78.5 |
| Standard Deviation | 6.8 | 6.1 | 11.9 | 46.9 |
| Aggregate Ratio | 1.29 | 1.36 | 1.63 | 5.20 |
| Si(OH)$_2$ | 4 | 2 | 4 | 3 |
| Si(OH)$_1$ | 48 | 47 | 45 | 36 |
| Si(OH)$_0$ | 48 | 57 | 51 | 61 |
| Peak Area Value | 10.073 | 11.123 | 11.978 | 18.335 |

TABLE 11

With Seed Particles

| Item | Example 5 1 times rate | Example 6 2 times rate | Comparative Example 3 4 times rate |
|---|---|---|---|
| Addition Rate (×10⁻³ g of silica/hour/m² of seed particle surface area) | 1.06 | 2.07 | 4.44 |
| pH | 8.20 | 7.74 | 7.73 |
| Specific Gravity | 1.058 | 1.134 | 1.133 |
| Silica Concentration (wt. %) | 10.15 | 21.61 | 21.37 |
| Kinematic Viscosity | 1.8 | 6.7 | 6.1 |
| Specific Surface Area (m²/g) | 113.35 | 113.87 | 116.20 |
| Primary Particle Diameter (nm) | 24.1 | 23.94 | 23.46 |
| Secondary Particle Diameter (nm) | 35.2 | 31.5 | 31.0 |
| Standard Deviation | 11.7 | 8.4 | 8.4 |
| Aggregate Ratio | 1.46 | 1.32 | 1.32 |
| Si(OH)$_2$ | 4 | 4 | 3 |
| Si(OH)$_1$ | 44 | 44 | 40 |
| Si(OH)$_0$ | 52 | 52 | 57 |
| Peak Area Value | 9.747 | 11.668 | 15.372 |

The invention claimed is:

1. A method for producing a colloidal silica, comprising the steps of:
   1) preparing a mother liquid comprising an alkali catalyst and water;
   2) separately preparing a hydrolyzed liquid by hydrolyzing tetramethyl orthosilicate in the absence of a catalyst; and
   3) after steps 1) and 2), adding, to the mother liquid, the hydrolyzed liquid to produce the colloidal silica wherein the hydrolyzed liquid is added to the mother liquid at a rate of not less than 0.7 g of silica/hour/kg of mother liquid and not greater than 41 g of silica/hour/kg of mother liquid; and the colloidal silica satisfies the following conditions:

a) with respect to a sample prepared by adding, as an internal standard, 1 wt. % of polydimethylsilane to a dried product of the colloidal silica, a peak area value calculated using a formula of a colloidal silica peak area/a polydimethylsilane peak area is 15 or less, the peak areas being determined by measuring a solid-state $^{29}$Si-CP/MAS-NMR spectrum of the dried product;

b) each amount of
   i) sodium,
   ii) an alkaline earth metal selected from calcium and magnesium; and
   iii) a heavy metal selected from iron, titanium, nickel, chromium, copper, zinc, lead, silver, manganese, and cobalt, contained in the colloidal silica is 1 wt. ppm or less.

2. A method for producing a colloidal silica, comprising the steps of:

1) preparing a mother liquid comprising an alkali catalyst, water and seed particles; and
2) separately preparing a hydrolyzed liquid by hydrolyzing tetramethyl orthosilicate by adding an equimolar amount or more of water relative to the methoxy group in the absence of a catalyst; and
3) after steps 1) and 2), adding, to the mother liquid, the hydrolyzed liquid to produce the colloidal silica, wherein the hydrolyzed liquid is added to the mother liquid at a rate of not less than $0.2 \times 10^{-3}$ g of silica/hour/m$^2$ of seed particle surface area and not greater than $4.2 \times 10^{-3}$ g of silica/hour/m$^2$ of seed particle surface area, and the colloidal silica satisfies the following conditions:

a) with respect to a sample prepared by adding, as an internal standard, 1 wt. % of polydimethylsilane to a dried product of the colloidal silica, a peak area value calculated using a formula of a colloidal silica peak area/a polydimethylsilane peak area is 15 or less, the peak areas being determined by measuring a solid-state $^{29}$Si-CP/MAS-NMR spectrum of the dried product;

b) each amount of
   i) sodium,
   ii) an alkaline earth metal selected from calcium and magnesium; and
   iii) a heavy metal selected from iron, titanium, nickel, chromium, copper, zinc, lead, silver, manganese, and cobalt, contained in the colloidal silica is 1 wt. ppm or less.

3. The production method according to claim 1, wherein the catalyst is an acid catalyst.

4. The production method according to claim 2, wherein the catalyst is an acid catalyst.

5. The production method according to claim 1, wherein step 2) is a step of separately preparing a hydrolyzed liquid by hydrolyzing tetramethyl orthosilicate by adding an equimolar amount or more of water relative to the methoxy group in the absence of a catalyst.

* * * * *